United States Patent
Harding et al.

(10) Patent No.: US 10,196,128 B2
(45) Date of Patent: Feb. 5, 2019

(54) ARTICULATION MECHANISM FOR FORMING A LOCK TO HOLD A WING TIP DEVICE IN A GROUND CONFIGURATION

(71) Applicant: Airbus Operations Limited, Bristol (GB)

(72) Inventors: Matthew Harding, Bristol (GB); Stefan Napier, Bristol (GB); Nicola Marongiu, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 256 days.

(21) Appl. No.: 15/349,269

(22) Filed: Nov. 11, 2016

(65) Prior Publication Data
US 2017/0137110 A1  May 18, 2017

(30) Foreign Application Priority Data
Nov. 18, 2015 (GB) .................. 1520290.6

(51) Int. Cl.
*B64C 3/56* (2006.01)
*B64C 13/28* (2006.01)

(52) U.S. Cl.
CPC .............. *B64C 3/56* (2013.01); *B64C 13/28* (2013.01); *Y02T 50/145* (2013.01)

(58) Field of Classification Search
CPC .. B64C 3/56; B64C 13/28; B64C 9/00; Y02T 50/145
See application file for complete search history.

(56) References Cited

U.S. PATENT DOCUMENTS

| 5,381,986 A | 1/1995 | Smith et al. |
|---|---|---|
| 2013/0292508 A1 | 11/2013 | Fox |
| 2016/0176508 A1* | 6/2016 | Fevergeon ............... B64C 9/18 244/217 |
| 2016/0264232 A1* | 9/2016 | Briancourt ............... B64C 3/56 |

FOREIGN PATENT DOCUMENTS

| DE | 102010005887 A1 | 7/2011 |
|---|---|---|
| WO | 2011051699 A2 | 5/2011 |
| WO | 2015162399 A1 | 10/2015 |

OTHER PUBLICATIONS

UKIPO Search Report dated May 9, 2016 in Great Britain Application No. 1520290.6.

* cited by examiner

*Primary Examiner* — Valentina Xavier
(74) *Attorney, Agent, or Firm* — Nixon & Vanderhye P.C.

(57) ABSTRACT

An aircraft wing is disclosed having a wing tip device configurable between a flight configuration for use during flight and a ground configuration for use during ground-based operations to reduce the span. The wing includes an actuator and an actuation assembly having an articulation mechanism having a master bell crank connected to the actuator and a slave link connecting the master bell crank with the wing tip device. The slave link is pivoted, at one end, to the master bell crank about a first pivot, and at the other end, to the wing tip device about a second pivot. The master bell crank being pivotably mounted, at its base, about a third pivot.

15 Claims, 31 Drawing Sheets

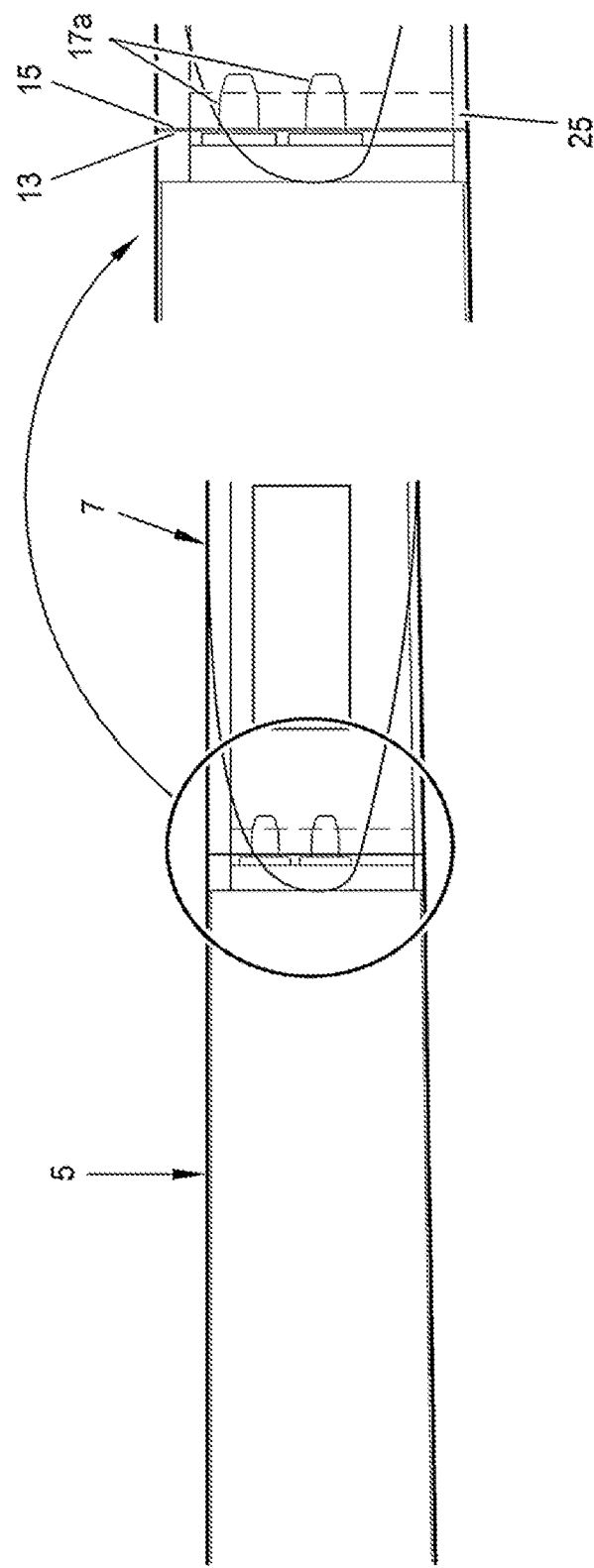

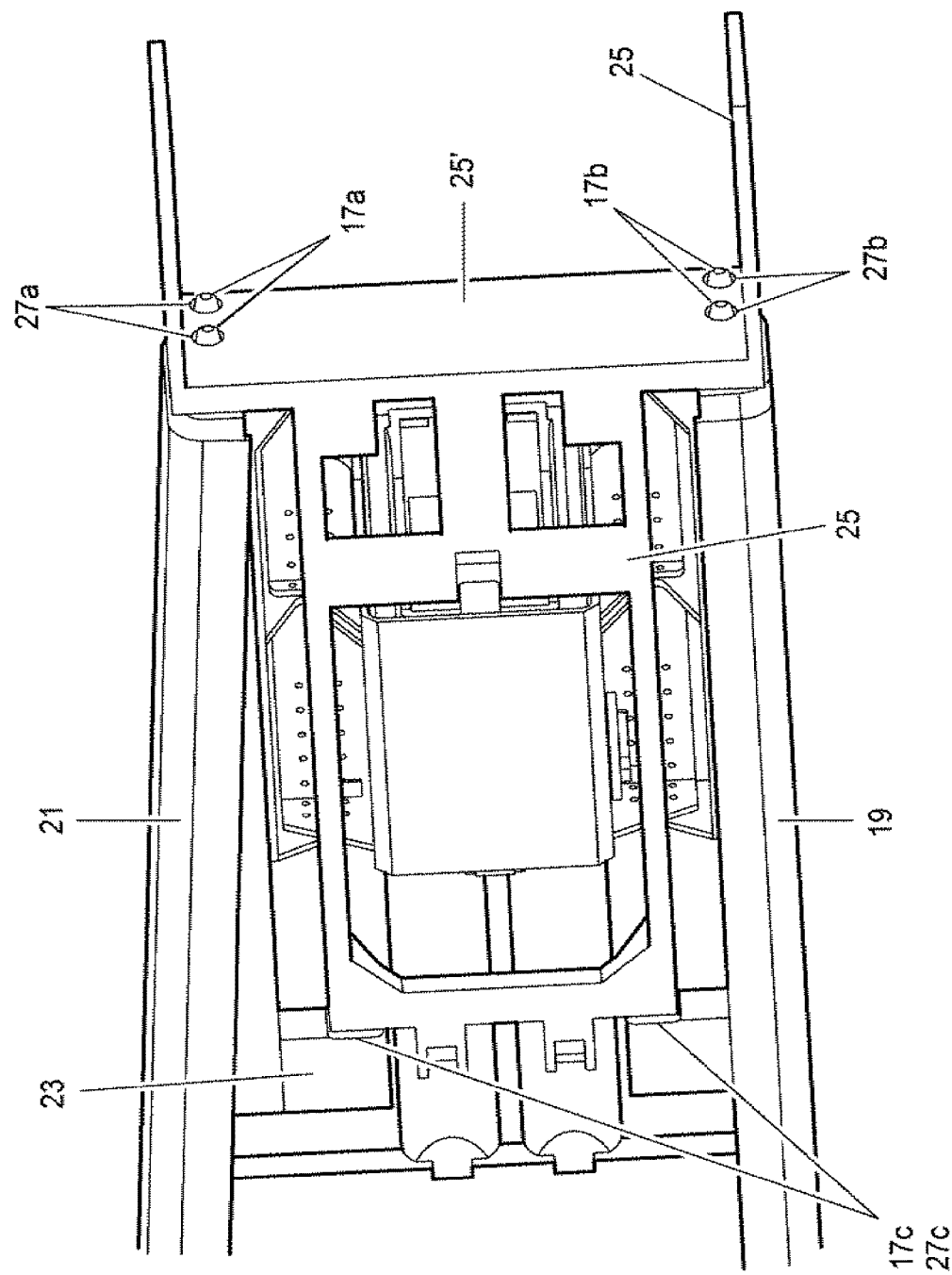

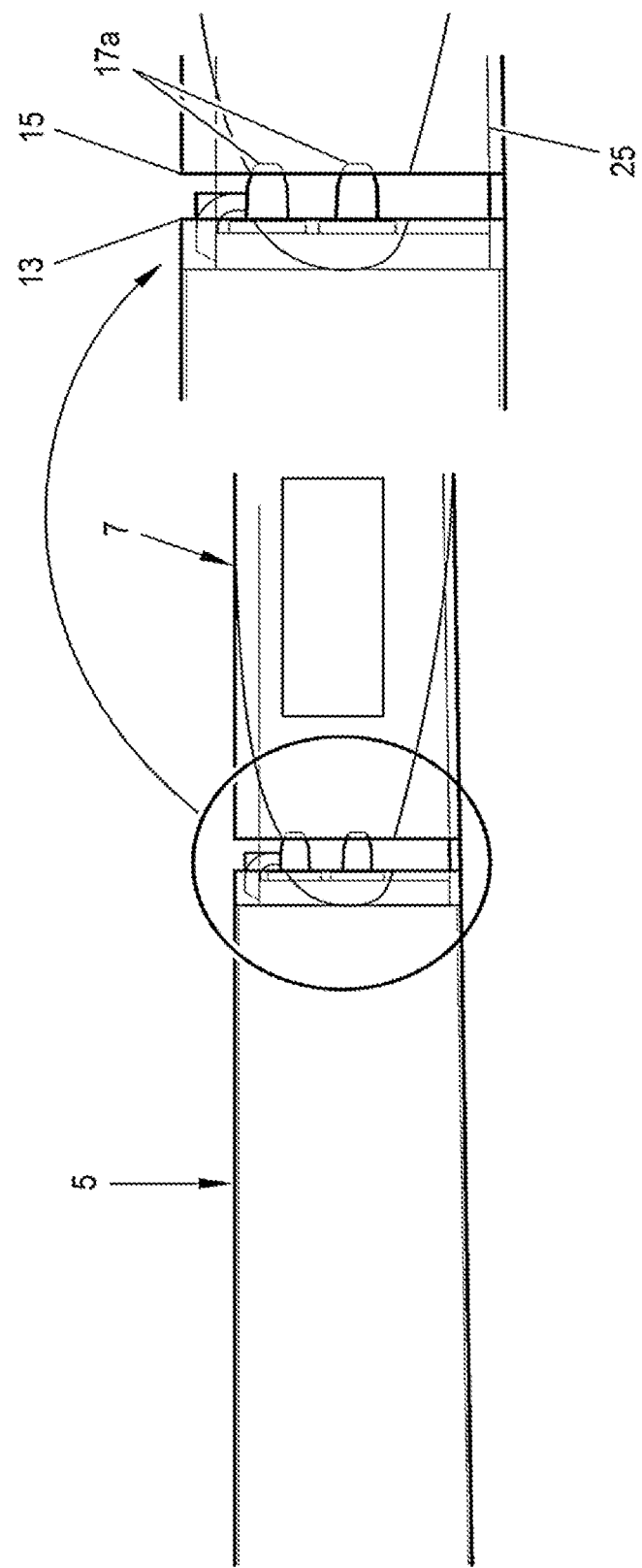

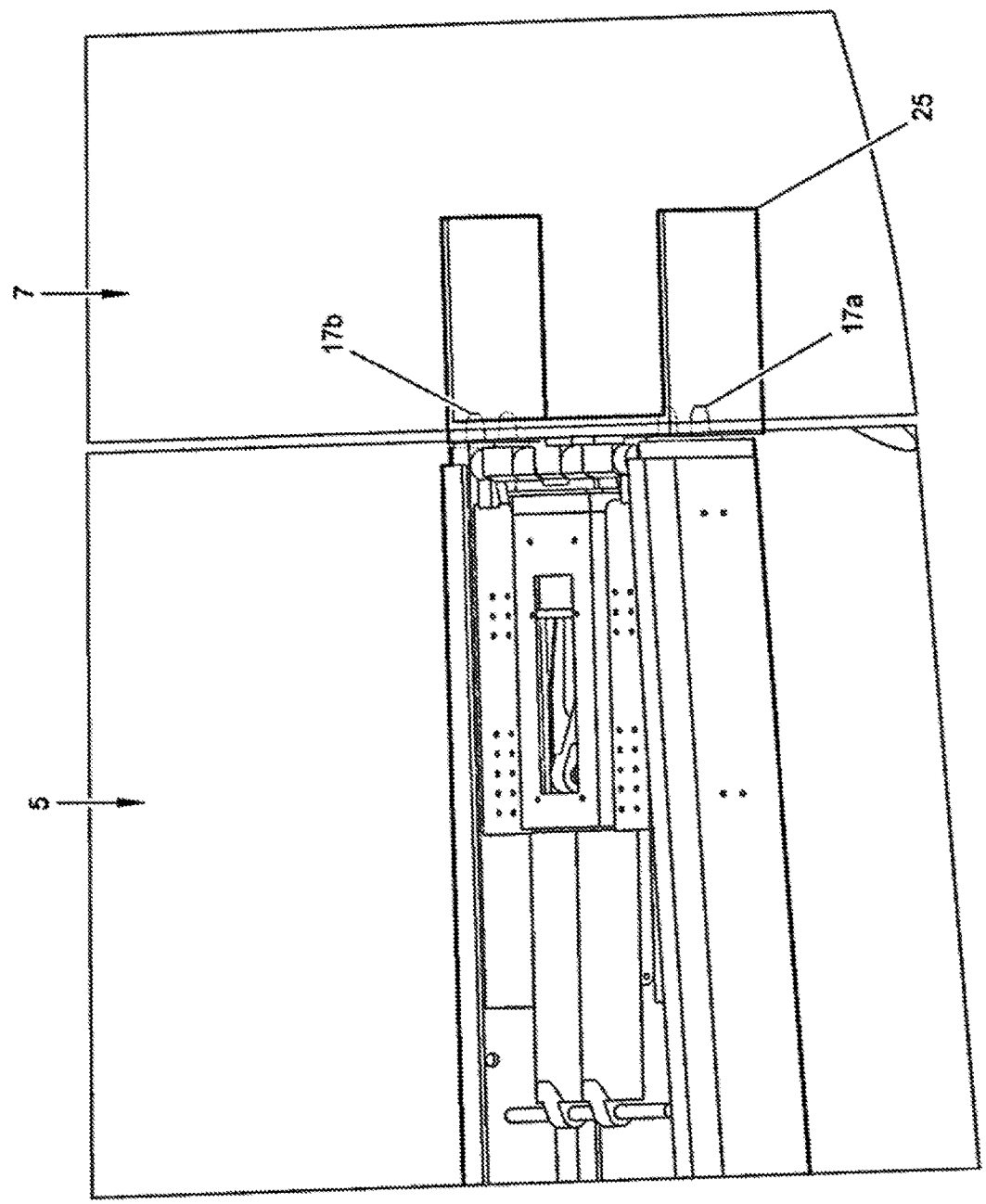

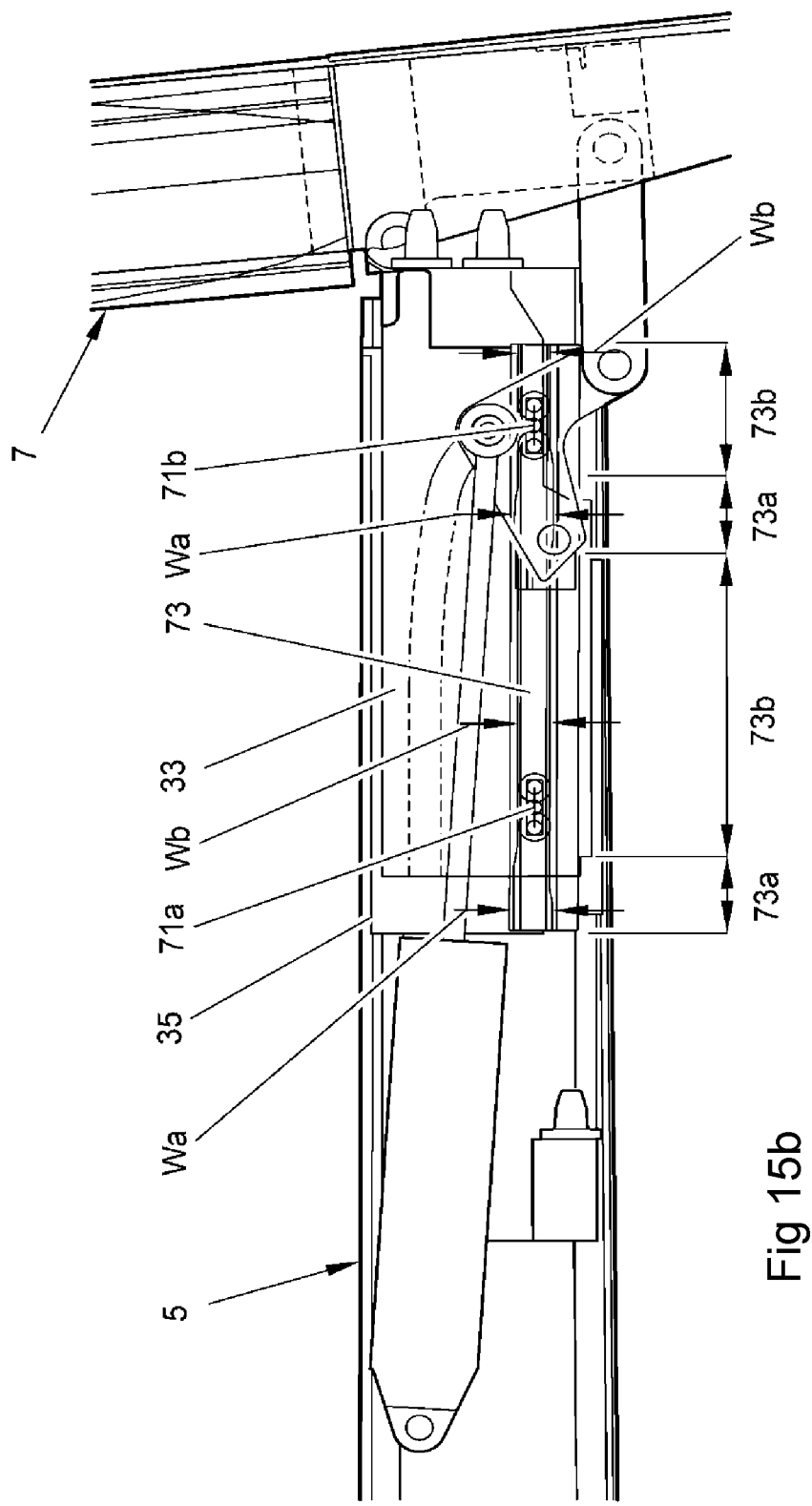

ARTICULATION MECHANISM FOR FORMING A LOCK TO HOLD A WING TIP DEVICE IN A GROUND CONFIGURATION

RELATED APPLICATIONS

The present application claims priority to Great Britain Patent Application Number 1520290.6, filed Nov. 18, 2015, the disclosure of which is hereby incorporated by reference herein in its entirety.

BACKGROUND OF THE INVENTION

The present invention relates to aircraft wings and wing tip devices, and more specifically, but not exclusively, to aircraft wings with moveable wing tip devices, actuation assemblies for use in such wings, aircraft incorporating such wings, and to methods of moving a wing tip device.

There is a trend towards increasingly large passenger aircraft, for which it is desirable to have correspondingly large wing spans. However, the maximum aircraft span is effectively limited by airport operating rules which govern various clearances required when manoeuvring around the airport (such as the span and/or ground clearance required for gate entry and safe taxiway usage).

Moveable wing tip devices have been suggested for use on passenger aircraft, where a wing tip device is movable between a flight configuration for use during flight, and a ground configuration for use during ground-based operations. In the ground configuration, the wing tip device is moved away from the flight configuration such that the span of the aircraft wing is reduced, thereby allowing use of existing gates and safe taxiway usage. By way of example, US 2013/0292508 discloses an arrangement in which the wing tip device is rotatable about a hinge located on the fixed (inner) wing. Other arrangements, such as that disclosed in WO2011/051699, enable a more complex movement of the wing tip device.

Aircraft having moveable wing tip devices, must be suitable for flight when the wing tip device is in the flight configuration yet must also be able to move the wing tip device, during ground-based operations. This can pose some difficulties:

Firstly, in the flight configuration it tends to be desirable to have a seal between the wing tip device and the fixed wing to ensure smooth airflow in this region and to minimise drag losses. However, if seals are used, they tend to be susceptible to significant wear during movement between the flight and the ground configurations.

Secondly, it is necessary for flight loads on the wing tip device to be adequately transferred into the main wing. Providing an arrangement in which the flight loads can be adequately transferred, whilst still enabling the wing tip device to be moved from that flight configuration to the ground configuration when required, can pose significant design difficulties.

There are also other technical challenges in providing a practical arrangement for moving a wing tip device between the flight and ground configurations. Amongst the issues to be addressed are: the problem of providing a safe and reliable arrangement to enable such movement without impacting unduly on the design of the wing; the problem of providing a compact and lightweight drive to effect the movement of the wing tip device; and the problem of how to secure the wing tip device in one or both of the flight and/or ground configurations.

The present invention seeks to mitigate at least some of the above-mentioned problems.

SUMMARY OF THE INVENTION

According to a first aspect of the invention, there is provided an aircraft wing comprising a fixed wing and a wing tip device at the tip thereof, wherein the wing tip device is configurable between: (i) a flight configuration for use during flight and (ii) a ground configuration for use during ground-based operations, in which ground configuration the wing tip device is moved away from the flight configuration such that the span of the aircraft wing is reduced, wherein the wing comprises an actuator and an actuation assembly, the actuation assembly comprising an articulation mechanism for transmitting the actuation force from the actuator such that actuation of the actuator moves the wing tip device between the flight and the ground configurations, wherein the articulation mechanism comprises a master bell crank connected to the actuator and a slave link connecting the master bell crank with the wing tip device, the slave link being pivoted, at one end, to the master bell crank about a first pivot, the slave link being pivoted, at the other end, to the wing tip device about a second pivot, and the master bell crank being pivotably mounted, at its base, about a third pivot, and wherein the articulation mechanism is arranged such that when the wing tip device is in the ground configuration, the master bell crank and the slave link are in an over-centre position such that the first pivot is out of line with the second and third pivots, thereby forming an over-centre lock to hold the wing tip device in the ground configuration.

Having the master bell crank and the slave link in an over-centre position forms an over-centre lock to hold the wing tip device in the ground configuration. This provides a simple, yet effective lock for holding the wing tip device in this configuration. Furthermore, since the actuator is connected to the articulation mechanism (to transmit the actuation force such that actuation of the actuator moves the wing tip device between the flight and the ground configurations) the same actuator can be used to both move the wing tip device, and to form the lock (by moving master bell crank and slave link into the over-centre condition). This removes the need for a separate actuator to lock/unlock the wing tip device in the ground configuration.

The actuator may be connected to the master bell crank at a rotatable connection. The rotatable connection is preferably constrained to move along a pre-determined locus upon actuation of the actuator.

The rotatable connection may be constrained to move along a groove, the shape of the groove determining the locus of movement of the connection.

At least part of the locus is preferably curved. The curve preferably curves downwards (when viewed moving along from the flight to the ground configurations). Shaping the locus in this manner preferably causes the master bell crank to rotate downwardly (as the connection moves along that curve). This in turn, may move the first pivot downwards. The curved locus may be arranged such that, when the wing tip device is in the ground configuration, the first pivot has moved below a notional line linking the second and third pivots (thereby forming the over centre lock).

The actuation assembly may be arranged such that the wing tip device is moved from the flight configuration to the ground configuration in a two-stage movement. The two-stage movement may comprise a first stage in which the wing tip device is translated away from the flight configuration in a linear movement only, and a second, subsequent stage, in which the wing tip device is rotated to the ground configuration.

A two stage movement, particularly a two stage movement in which the first stage is a linear movement only, has been found to be particularly beneficial. For example, having a first stage that is only a linear movement, tends to reduce the wear on any sealing arrangement between the fixed wing and the wing tip device, because it tends to avoid relatively rotation occurring between sealing surfaces. Alternatively or additionally, having a first stage that is only a linear movement, may facilitate engagement between the fixed wing and the wing tip device to ensure an effective load-transfer arrangement.

In principle, the second stage of movement may comprise some translational movement in combination with the rotational movement. In preferred embodiments of the invention however, the wing tip device, in the second stage of movement, undergoes substantially no translational movement. In that second stage of movement, the wing tip device is preferably rotated in a rotational movement only.

In the flight configuration the trailing edge of the wing tip device is preferably a continuation of the trailing edge of the fixed wing. The leading edge of the wing tip device is preferably a continuation of the leading edge of the fixed wing. There is preferably a smooth transition from the fixed wing to the wing tip device. It will be appreciated that there may be a smooth transition, even where there are changes in sweep or twist at the junction between the inner wing and wing tip device. However, there are preferably no discontinuities at the junction between the fixed wing and wing tip device. The upper and the lower surfaces of the wing tip device may be continuations of the upper and lower surfaces of the fixed wing.

The first stage of movement is preferably arranged to separate the wing tip device from the fixed wing. When separated, the upper and lower surfaces of the wing tip device are preferably no longer continuations of the respective upper and lower surfaces of the fixed wing. The respective upper and lower surfaces are preferably separated such that they no longer abut, or otherwise contact, each other. The respective upper and lower surfaces are preferably separated such that they are spaced apart in the direction of movement of the first stage.

One of the fixed wing and the wing tip device may comprise a plurality of male members, such as spigots. The other of the fixed wing and the wing tip device may comprise a plurality of corresponding female members, such as bushes. The female members may be arranged to receive the male members when the wing tip device is in the flight configuration, such that flight loads may be transferred, via the male members, from the wing tip device into the fixed wing. Such an arrangement tends to be beneficial because it enables flight loads to be adequately managed and reacted into the fixed wing.

The male and female members may be arranged to transfer bending moments into the fixed wing. The male and female members may be arranged to transfer vertical and/or forward/aft shear loadings into the fixed wing. The male and female members may be arranged such that they are substantially unable to transfer inboard/outboard loads (along the span of the wing) into the fixed wing. For example, the male and female members may be arranged such that they are substantially unable to transfer loads in a direction along the mean chord line, into the fixed wing.

The longitudinal axes of the male members may extend in a first direction. The actuation assembly may be arranged such that the first stage of movement is a translation in the first direction only. Such an arrangement has been found to be beneficial because it minimises the wear and/or out-of-plane forces, acting on the male member during movement from the flight to the ground configuration.

The first stage of movement is preferably a translation in an outboard direction along the length of the wing. The outboard direction is preferably substantially parallel to a main spar of the fixed wing. The outboard direction may be substantially perpendicular to the ribs of the fixed wing.

The actuation assembly may comprise a hinge about which the wing tip device is rotatable during the second stage of movement. In some embodiments of the invention, the wing tip device may be prevented from rotating during the first stage of movement, but be free to rotate during the second stage of movement.

The actuation assembly may comprise a sliding chassis, slideably moveable relative to the fixed wing. The sliding chassis may be coupled to the wing tip device. The sliding chassis may comprise, or otherwise be associated with, the hinge. The hinge may be fixed, relative to the sliding chassis. The actuation assembly may be arranged such that, during the first stage of movement, the sliding chassis is arranged to translate, thereby creating a linear movement of the wing tip device (for example via the linear movement of the hinge).

The actuation assembly may comprise a translational stop feature, arranged to limit the extent of the translational movement, away from the flight configuration. The translational stop feature may be arranged to limit the extent of the translational movement of the sliding chassis.

The sliding chassis may contain the articulation mechanism.

The articulation mechanism may be arranged to transfer the actuation force into the wing tip device at a location remote from the hinge, thereby creating a moment arm to rotate the wing tip device. For example, the second location may be remote from the hinge and the second direction may be such that the force is offset from the hinge.

Actuation of the master bell crank preferably results in a tensile or compressive force along the slave link (that force being arranged to act on the wing tip device). The tensile or compressive force is preferably in a direction that is non-parallel to the direction of the actuation force (for example non parallel to the extension direction of a linear actuator).

The third pivot may be slideably moveable relative to the sliding chassis. master bell crank may be pivotably mounted on the sliding chassis about the third pivot. The first location (on which the actuation force acts) may be located between the third pivot and the first pivot at the other end of the bell crank (at which the link is attached).

In principle, the sliding chassis may be mounted on the fixed wing in any manner that enables sliding movement. More preferably however, the actuation assembly comprises a fixed chassis onto which the sliding chassis is slideably mounted. The fixed chassis may be fixedly attached to the fixed wing. Providing a fixed chassis on which the sliding chassis is mounted has been found to be especially beneficial because it enables the actuation assembly to be pre-assembled as a unit, and for example tested, at a location remote from the aircraft wing. Such an articulation assembly may then be able to be installed in the wing in an efficient manner.

In embodiments in which the wing undergoes a two-stage movement, the actuation assembly is preferably arranged such that the same actuator is arranged to effect both the first and the second stages of movement. Such an arrangement is beneficial from both a weight and an airworthiness perspective as it minimises the number of critical components being used. The actuator is preferably a linear actuator. The actuator may be coupled to the fixed wing at one end, and coupled to the actuation assembly (for example the articulation mechanism) at the other end.

In the flight configuration, the span of the aircraft may exceed an airport compatibility gate limit. In the ground configuration the span of the aircraft is preferably reduced such that the span (with the wing tip device in the ground configuration) is less than, or substantially equal to, the airport compatibility gate limit.

When the wing tip device is in the ground configuration, the aircraft incorporating the wing, may be unsuitable for flight. For example, the wing tip device may be aerodynamically and/or structurally unsuitable for flight in the ground configuration. The aircraft is preferably configured such that, during flight, the wing tip device is not moveable to the ground configuration. The aircraft may comprise a sensor for sensing when the aircraft is in flight. When the sensor senses that the aircraft is in flight, a control system is preferably arranged to disable the possibility of moving the wing tip device to the ground configuration.

The wing tip device may be a wing tip extension; for example the wing tip device may be a planar tip extension. In other embodiments, the wing tip device may comprise, or consist of, a non-planar device, such as a winglet.

The two-stage movement described herein tends to be described with reference to movement of the wing tip device from the flight configuration to the ground configuration. The actuation assembly is preferably arranged to also move the wing tip device from the ground configuration to the flight configuration in a two-stage movement. The two stage movement is preferably the reverse of the movement from the flight to the ground configuration. In other words, the wing tip device is rotated from the ground configuration, and then, subsequently, translated towards the flight configuration in a linear movement only. For the sake of clarity, each and every feature is not described herein with reference to both directions of movement. Instead, it will be appreciated that any features described with reference to one direction of movement, may be equally applicable, in reverse, to the reverse direction of movement.

According to another aspect of the invention, there is provided an actuation assembly as described herein. The actuation assembly may comprise the articulation mechanism arranged such that when the wing tip device is in the ground configuration, the master bell crank and the slave link are in an over-centre position such that the first pivot is out of line with the second and third pivots, thereby forming an over-centre lock to hold the wing tip device in the ground configuration.

The assembly may comprise a fixed chassis for installation into a wing and a sliding chassis, slideably mounted in the fixed chassis. The sliding chassis may comprise a hinge, fixed relative thereto, about which a wing tip device may be mounted for rotational movement. The sliding chassis may carry an articulation mechanism for transferring an actuation force acting at a first location, and in a first direction, into an actuation force acting in a second location and in a second direction, such that a force may be applied to rotate the wing tip device about the hinge.

The actuation assembly may comprise a fixed chassis for installation into a wing and the sliding chassis is slideably mounted in the fixed chassis.

According to another aspect of the invention there is provided a wing tip device coupled to the actuation assembly described herein.

According to another aspect of the invention there is provided an aircraft comprising the aircraft wing described herein. The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted, and preferably underwing, engines.

According to yet another aspect of the invention, there is provided a method of moving, and subsequently locking, a wing tip device in position using a common actuator, the wing tip device being in an aircraft wing comprising a fixed wing and a wing tip device at the tip thereof, wherein the wing tip device is configurable between: (i) a flight configuration for use during flight and (ii) a ground configuration for use during ground-based operations, in which ground configuration the wing tip device is moved away from the flight configuration such that the span of the aircraft wing is reduced, the method comprising the step of: providing an articulation mechanism comprising a master bell crank connected to the actuator and a slave link connecting the master bell crank with the wing tip device, the slave link being pivoted, at one end, to the master bell crank about a first pivot, the slave link being pivoted, at the other end, to the wing tip device about a second pivot, and the master bell crank being pivotably mounted, at its base, about a third pivot, and actuating the actuator to move the wing tip device from the flight to the ground configuration, the articulation mechanism being arranged such that when the wing tip device is in the ground configuration, the master bell crank and the slave link are in an over-centre position such that the first pivot is out of line with the second and third pivots, thereby forming an over-centre lock to hold the wing tip device in the ground configuration.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

An embodiment of the present invention will now be described by way of example only with reference to the accompanying schematic drawings of which:

FIG. 3a shows a frontal view of the wing of FIG. 2a with the wing tip device in the flight configuration;

FIG. 3b shows a partial cut-away view of the underside of the wing of FIG. 2a;

FIG. 4a is the frontal view of FIG. 3a but with the wing tip device having undergone a first stage of movement, from the flight configuration towards the ground configuration;

FIG. 4b is a plan view of the wing in FIG. 4a;

FIG. 7b is a cut-away front view of the wing in FIG. 7a;

FIG. 9b is a cut-away front view of the wing in FIG. 9a;

FIG. 10b is a cut-away front view of the wing in FIG. 10a;

FIGS. 15a and 15b are sectional views along a spar-wise cut in the wing, showing the actuation assembly 31.

DETAILED DESCRIPTION

Figure 1:
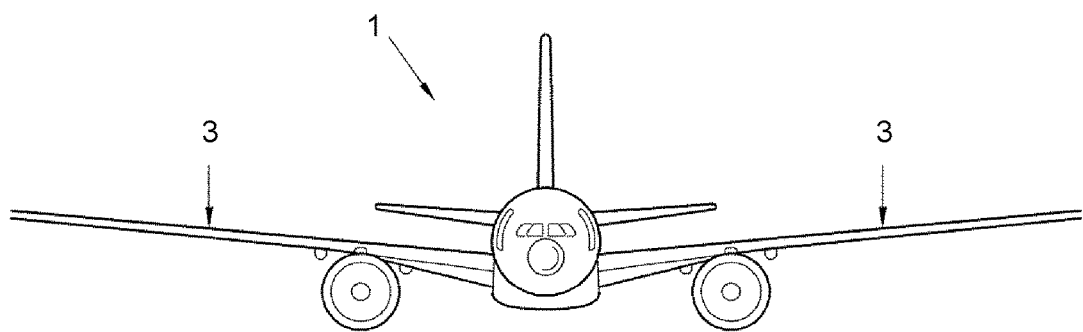
FIG. 1 shows a front view of an aircraft having aircraft wings according to a first embodiment of the invention.
Figure 2A:
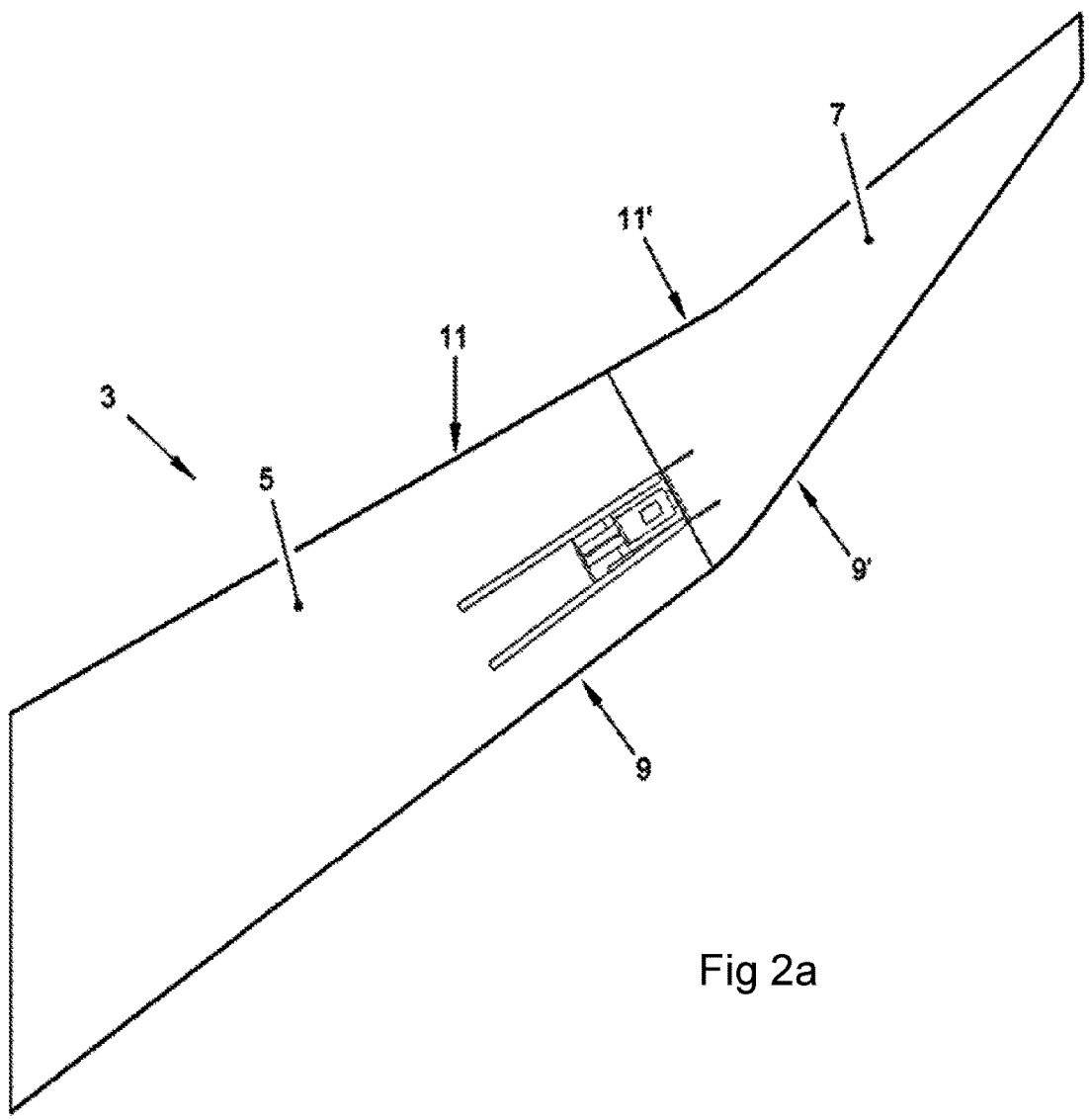
FIG. 2a shows one of the wings of the aircraft of FIG. 1, with the wing tip device in the flight configuration.

FIG. 1 is a schematic drawing showing an aircraft 1 having aircraft wings 3 according to a first embodiment of the invention. The end of one of the wings 3 on the aircraft 1 is shown in more detail in FIGS. 2a and 2b, to which reference is now made:

The wing 3 comprises a fixed wing 5 extending from the wing root at the aircraft fuselage, to a tip. At the tip of the fixed wing 5 there is a wing tip device 7. The wing tip device 7 is moveable between a flight configuration (shown in FIG. 2a) and a ground configuration (shown in FIG. 2b).

In the flight configuration the wing tip device 7 is effectively an extension of the fixed wing 5, such that the leading and trailing edges 9', 11' of the wing tip device are continuations of the leading and trailing edges 9, 11 of the fixed wing 5, and the upper and lower surfaces of the wing tip device 7 are continuations of the upper and lower surfaces of the fixed wing 5. The fixed wing and the wing tip device together form a main wing 3 on the aircraft 1.

Figure 2B:
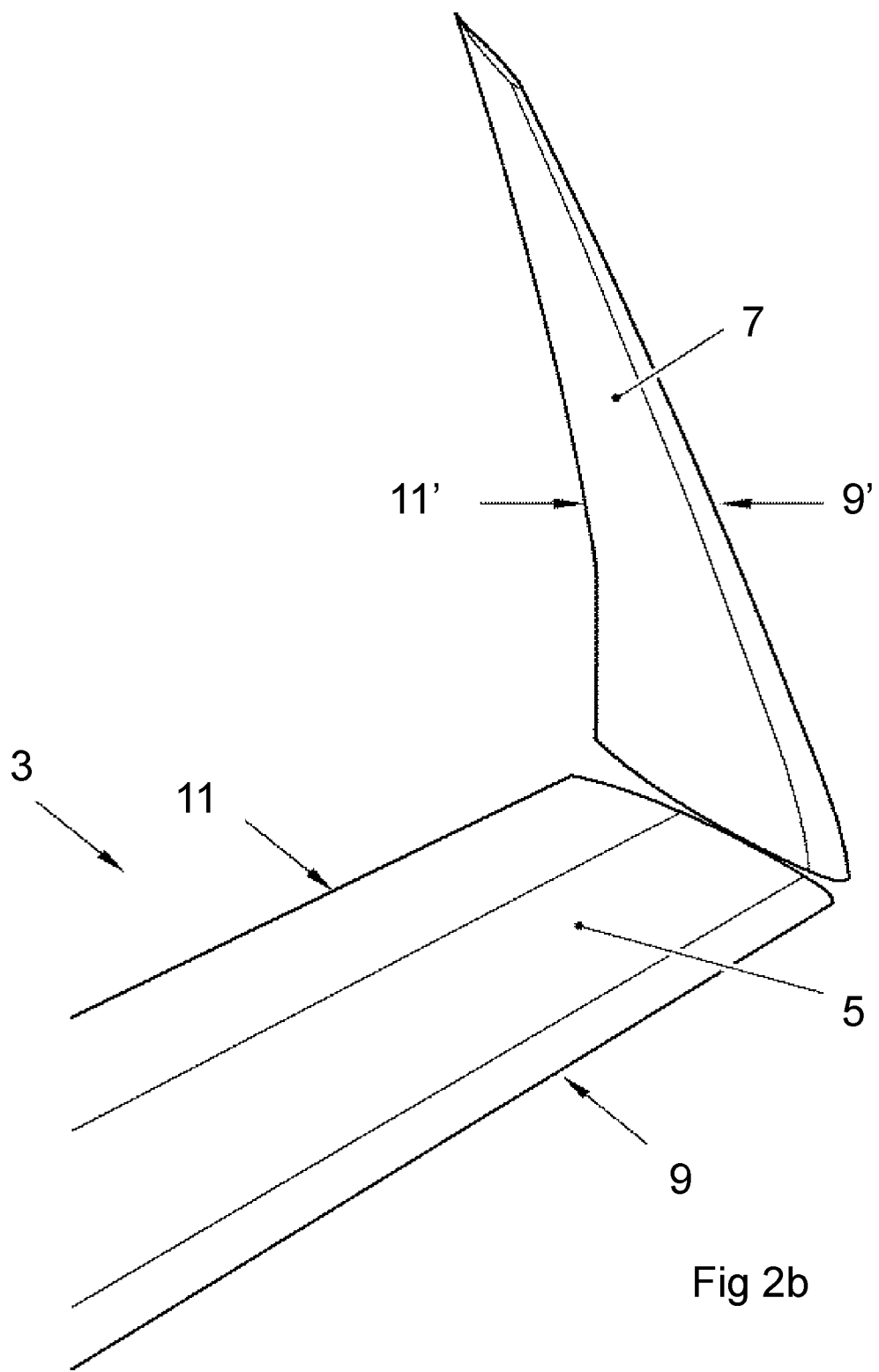
FIG. 2b shows the wing of FIG. 2a but with the wing tip device in the ground configuration.

The wing tip device 7 is moveable from the flight configuration (shown in FIG. 2a) to a ground configuration (shown in FIG. 2b). In the ground configuration, the wing tip device 7 is moved such that the span of the aircraft 1 is reduced (relative to the flight configuration). This enables the aircraft 1 to have a relatively large span during flight (which flight span exceeds airport gate limits), whilst still complying with airport gate limits, safe taxiway usage etc., when on the ground.

Having a moveable wing tip device per se, to achieve this span reduction on the ground, is known. However, the first embodiment of the invention provides an improved way of moving the wing tip device between the two configurations, as will now be explained with reference to the other Figures.

Many of the Figures have been produced from Computer Aided Design (CAD) packages. Thus, it will be appreciated that some of the Figures include constructional lines, and/or some lines showing hidden, or internal, features of the embodiment.

FIGS. 3a to 6 show the position of the wing tip device 7 at different times (and from different viewpoints) as the wing tip device 7 moves from the flight configuration to the ground configuration.

FIGS. 3a and 3b are both views of the end of the wing 3 with the wing tip device 7 in the flight configuration. As best illustrated in FIG. 3a (which is a frontal view), the upper and lower surfaces of the wing are substantially continuous across the junction between the fixed wing 5 and the wing tip device 7. The interfacing edges 13, 15 of the fixed wing 5 and the wing tip device 7 comprise resiliently deformable "P" seals (not visible in the Figures), which are compressed in the flight configuration to seal the junction and prevent aerodynamic leakage flow across it.

The flight configuration is for use during flight, so it is important that the wing tip loads (arising from aerodynamic forces and/or inertial loads) are transferred into the fixed wing 5. In this respect, the fixed wing 5 of the first embodiment comprises three pairs of fixed spigots 17a, 17b, 17c. Two pairs 17a, 17b protrude from the outboard ends of the main spar 19 and front spar 21, and one pair 17c protrude from an inboard structure 23 of the spars, such that some of the loads can be reacted inboard on the fixed wing 5. A support frame 25 of the wing tip device 7 comprises corresponding holes 27a-c, lined with bushes, arranged to receive the spigots 17a, 17b, 17c when the wing tip device 7 is in the flight configuration. The engaging spigots/bushes 17a-c/27a-c enable loads in the wing tip device 7 to be reacted into the spars 19, 21 of the fixed wing 5.

The longitudinal axes of the spigots (and the bushes) extend in an outboard direction, substantially aligned with the spars 19, 21, and substantially in the plane of the fixed wing 5. Thus, the engaging spigots/bushes 17a-c/27a-c are particularly effective in transferring vertical and forward/aft loads (which are the predominant loads experienced by the wing tip device 5 during flight).

The spigots and bushes 17a-c/27a-c are best illustrated in FIGS. 3b, and 13a-c, in which the wing skin has been removed for clarity. FIG. 3a also shows close-up view of one of the pairs of spigots 17a, in phantom, extending through the bushes 27a in the root 25' of the support frame 25.

FIGS. 4a and 4b show the wing after a first stage of movement of the wing tip device 7 towards the ground configuration. The wing tip device 7 has undergone a translational movement in an outboard direction along the wing (shown by the large arrow in FIG. 4b). It is important to note that this movement is only a translation and it does not comprise any rotational component of movement. Having this type of initial movement away from the flight configuration, has been found to give rise to two advantages. Firstly, the movement is parallel to the axes of the pairs of spigots 17a-c. Thus it enables the wing tip device 7 to readily disengage from the spigots 17a-c (i.e. the spigots 17a-c are moved clear of the bushes 27a-c) without requiring secondary mechanisms to retract, or otherwise move, the spigots. Secondly, this translational movement enables the "P" seals to be broken (i.e. separated) without a relative rotational component of movement. Having a rotational component of movement when breaking a seal has been found to increase wear of the seal, so ensuring a linear separation tends to minimise any wear and may enable an improved sealing arrangement.

In the first embodiment of the invention, the movement to the ground configuration is a two-stage movement. The first stage is the translational movement described above and with reference to FIGS. 4a and 4b (i.e. to separate the seals and move the spigots clear of the bushes). The second stage is a rotational movement described below with reference to FIGS. 5a and 5b.

Figure 5A:
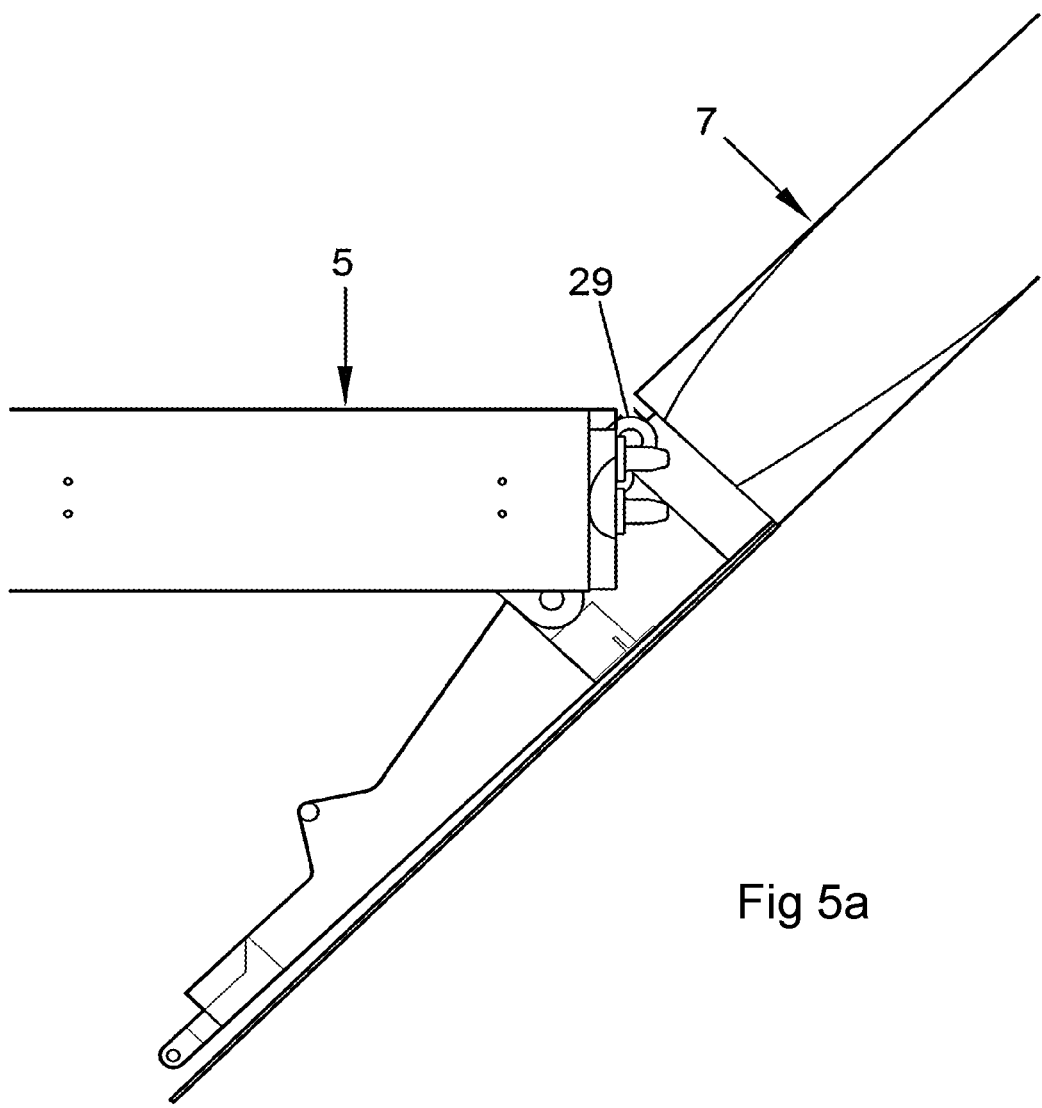
FIG. 5a is a frontal view of the wing of FIG. 4a but with the wing tip device having partly undergone a second stage of movement, towards the ground configuration.
Figure 5B:
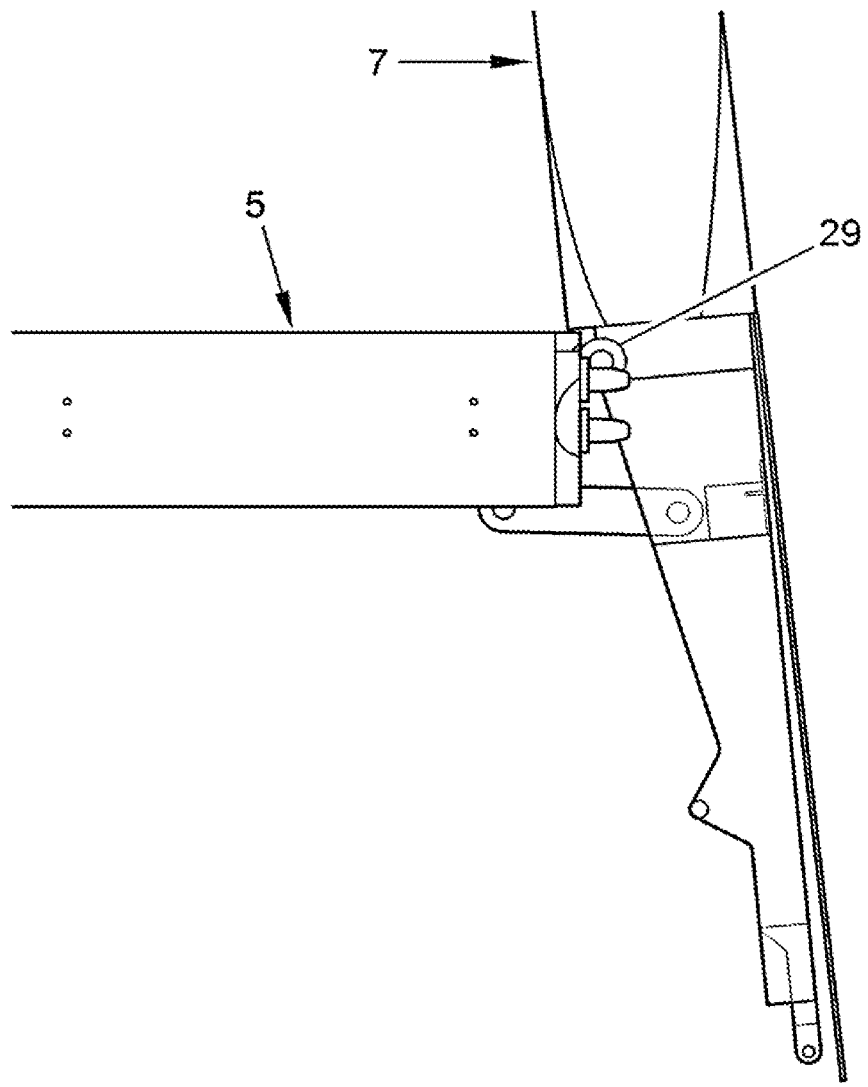
FIG. 5b is a frontal view of the wing of FIG. 5a but with the wing tip device having completed movement to the ground configuration.

After the first stage of movement, the wing tip device 7 is arranged to rotate (and only rotate) to the ground configuration. As shown in FIGS. 5a and 5b, the rotation is about a hinge 29 located near the upper surface of the wing. The wing tip device 7 is rotated to bring it into a slightly over-vertical position (FIG. 5b). This position is geometrically stable and also maximises the span reduction that can be achieved. The wing tip device 7 is held in position by a lock (described in more detail below with reference to FIG. 10b).

Having a second stage of movement that is a substantially pure rotation has been found to be beneficial because it avoids any increase in span that might otherwise occur with a translational movement outboard.

The wing tip device 7 is also moveable in the reverse of the above-described movement when moving from the ground configuration to the flight configuration. In other words, when moving into the flight configuration (for example is preparation for take-off) the wing tip device 7 is first rotated downwardly about the hinge 29 until it is substantially in-plane with the fixed wing 5. The wing tip device 7 is then translated onto the spigots 17a-c such that they engage with the bushes 27a-c and such that the wing tip device 7 abuts the tip of the fixed wing 5, thereby compressing the seal at the interface.

Figure 6:
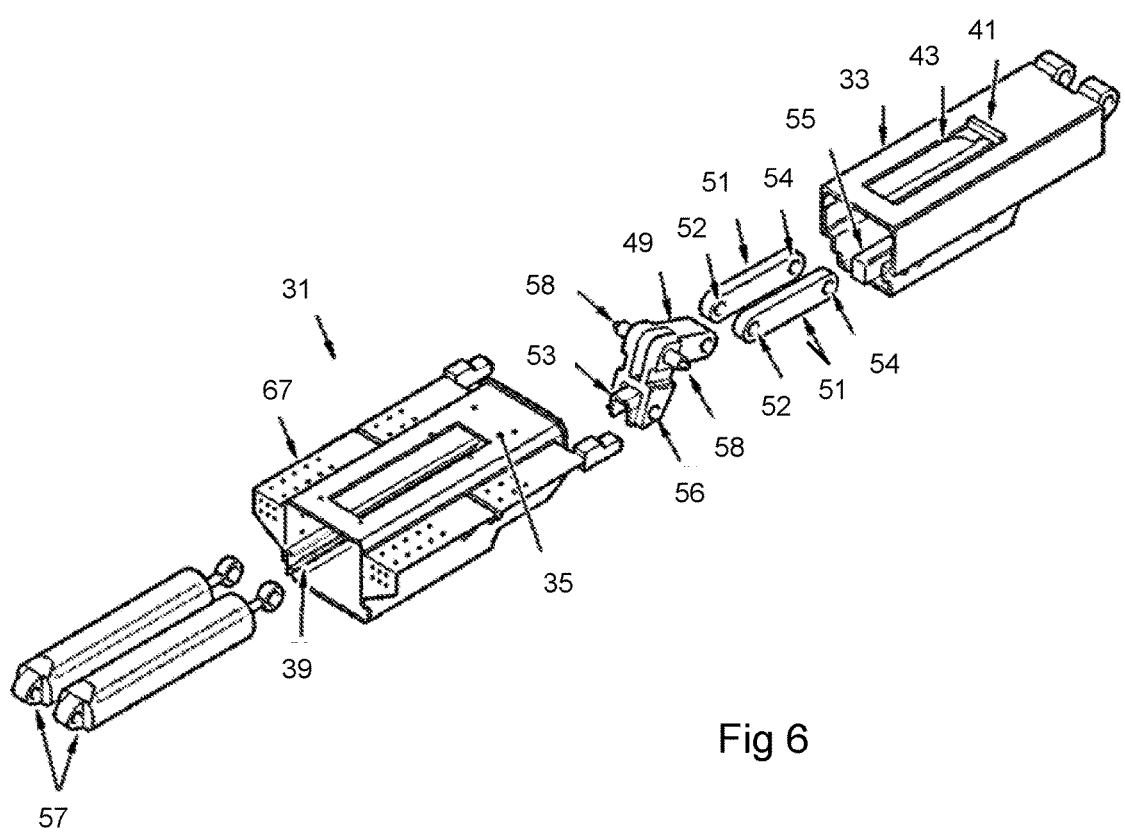
FIG. 6 is an exploded perspective view of the articulation assembly in the wing of the first embodiment.

The description above, with reference to FIGS. 3a to 5b of the first embodiment of the invention, illustrates the nature of the two-stage movement of the wing tip device 7. That movement is enabled by an actuation assembly 31 located in the fixed wing. The details of the actuation assembly 31 are shown in FIG. 6 onwards, and will now be described:

FIG. 6 is an exploded view of the actuation assembly. The actuation assembly 31 comprises a sliding chassis 33, contained in a fixed chassis 35. The sliding chassis 33 is mounted on two pairs of spring-loaded bogies 37 such that the sliding chassis 33 is slideably moveable along two respective tracks 39 within the interior side faces of the fixed chassis 35. The sliding chassis 33 comprises a lip 41 that protrudes through an open channel 43 in the top of the fixed chassis 35 thereby forming a translational stop feature (discussed in more detail below).

Figure 7A:
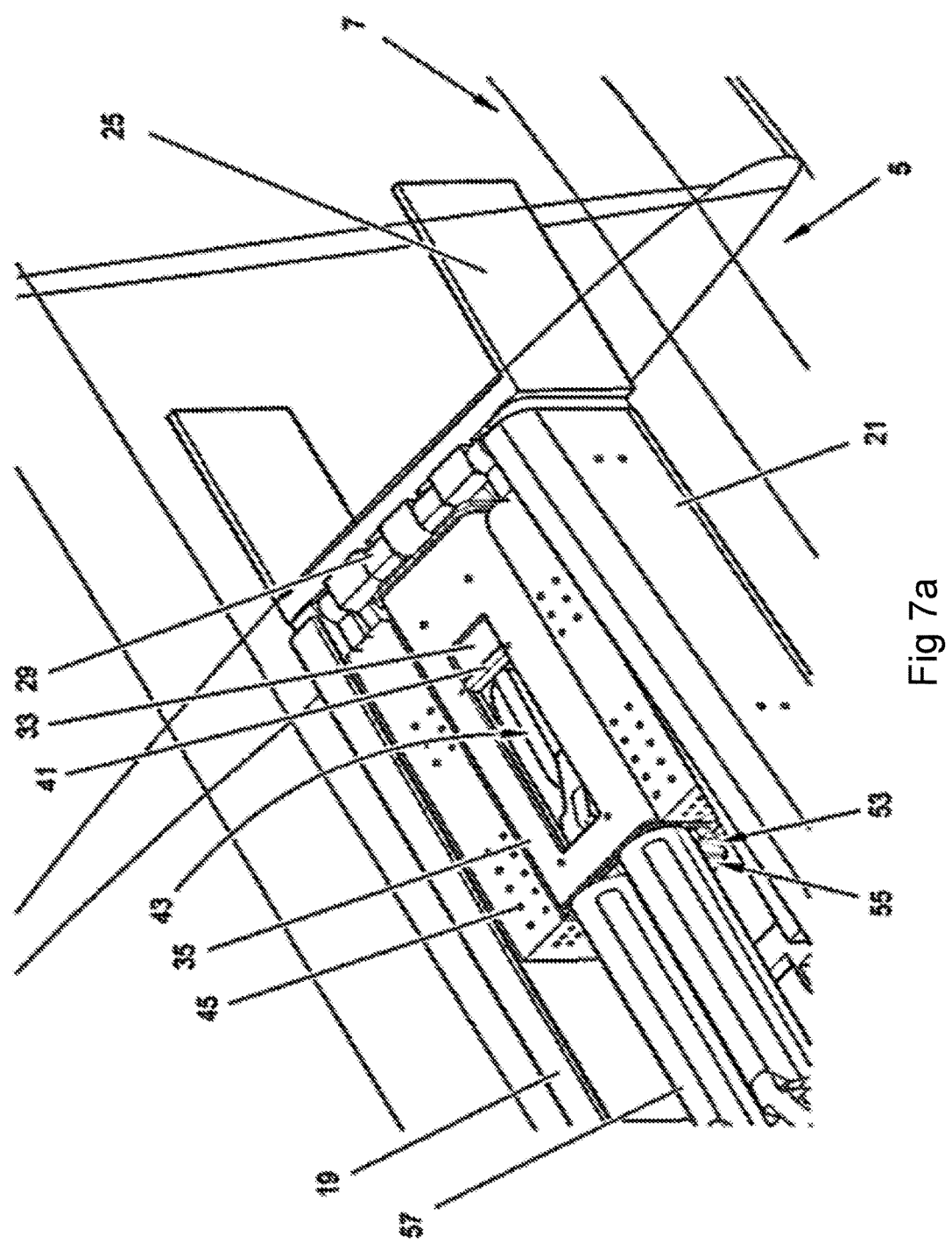
FIG. 7a is a cut-away perspective view of the wing in the first embodiment of the invention, showing the actuation.

The fixed chassis 35 is itself fixedly attached to a bath-tub fitting 45 located between the front and rear spars of the fixed wing 5 (see FIG. 7a).

The sliding chassis 33 contains an articulation mechanism 47 comprising a master bell crank 49 and a slave link 51. The slave link 51 is pivoted, at one end, to the master bell crank 49 about a first pivot 52. The slave link 51 is pivoted, at the other end, to the wing tip device 7 about a second pivot 54, The master bell crank 49 is pivotably mounted at one end about a third pivot 56 that is mounted on a slider 53, arranged to move along a central rail 55 in the sliding chassis 33. Between the ends of the bell crank 49 the centre of the bell crank is connected, at a rotational connection 58, to a linear actuator assembly 57 comprising two linear actuators 57. This rotational connection 58 is constrained to move along a drooping groove 61 defined in the sliding chassis structure.

The sliding chassis 33 is also connected to the wing tip device 7 via the hinge 29 located at the distal end of the sliding chassis 31. The outer ends of the hinge include a kidney-shaped end-cap 63. The end-caps 63 are arranged to abut (in the flight configuration) an abutment surface 65 on the fixed chassis 35 thereby forming a rotational stop feature (discussed in more detail below).

Figure 7B:
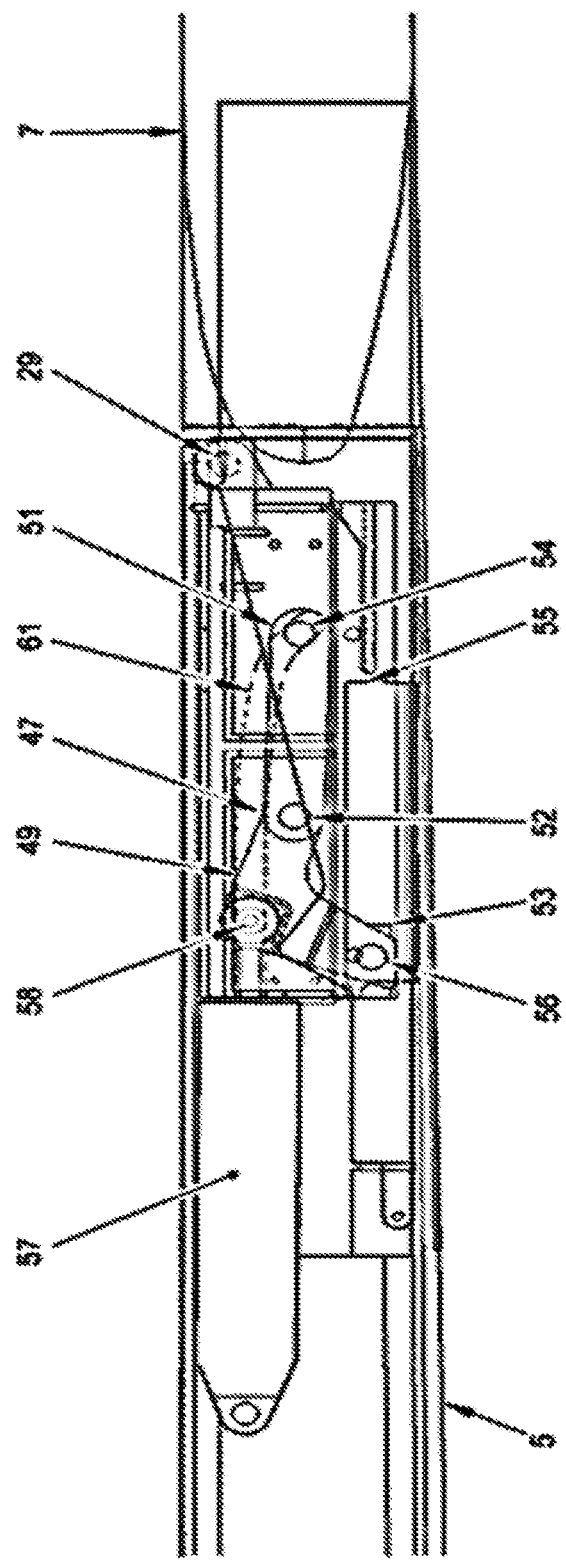
Figure 7C:
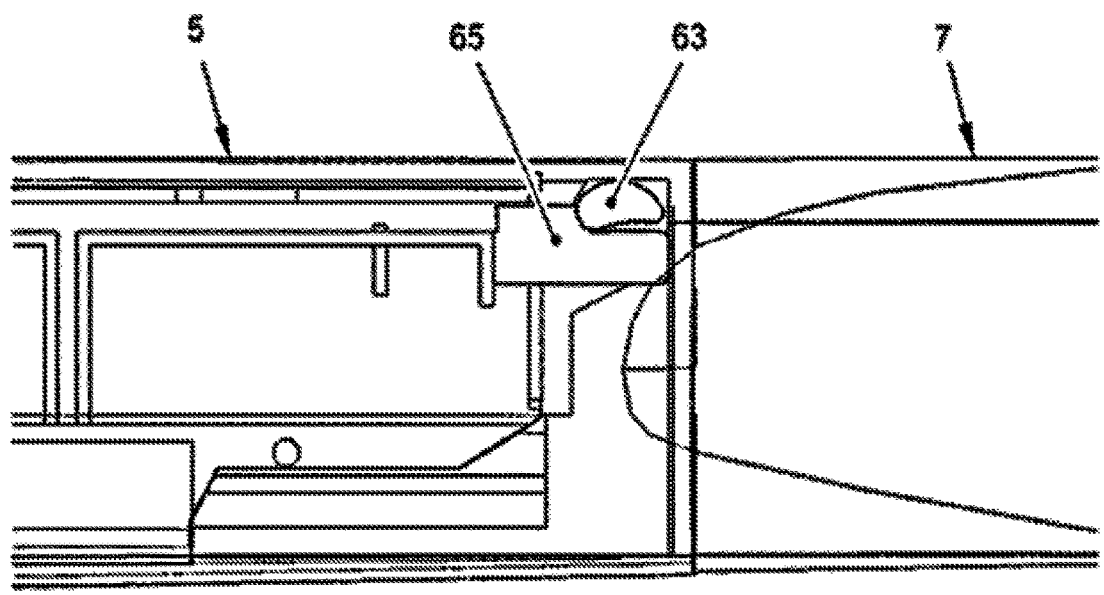
FIG. 7c is a cut-away front view of the wing in FIGS. 7a and 7b, showing the rotational stop feature.

FIGS. 7a to 7c show the actuation assembly 31 when the wing tip device 7 is in the flight configuration. At this time, the actuators 57 are fully retracted and the sliding chassis 33 is at its rearmost (i.e. furthest inboard) position such that it is flush with the end of the fixed chassis 35. The lip 41 on the sliding chassis 33 that extends out of the open channel 43 in the fixed chassis 35 is a linear distance X from the end of the channel. The articulation mechanism 47 is pulled back as far as possible by the actuators 57 such that the link 51 is almost horizontal. As shown in FIG. 7c, the kidney-shaped end-stop 63 on the hinge 29 is received in a tight fit against the abutment surface 65 of the fixed chassis 35.

To begin the movement to the ground configuration, and more specifically to effect the first stage of that movement, the actuators 57 are extended. The kidney-shaped end-stop 63 is prevented from rotating by the abutment surface 65 on the fixed chassis 35, and the wing tip device 7 is thus unable to rotate relative to the actuation assembly 31. Instead, the extension of the actuators 57 pushes the sliding chassis 33 (via the articulation mechanism 47 which is forced to act as a rigid link due to the presence of the rotational stop 63, 65). This causes a pure translational movement in the actuation assembly 31, relative to the fixed chassis 35. Such movement is parallel to the axes of the spigots 17a-c. Since the wing tip device 7 is coupled to the sliding chassis 33, along the hinge 29, this movement acts to push the wing tip device 7 along the length of the spigots 17a-c until they are clear of the bushes 27a-c. The moment at which the spigots 17a-c have just cleared the bushes 27a-c is shown in FIGS. 8a to 8d.

Figure 8A:
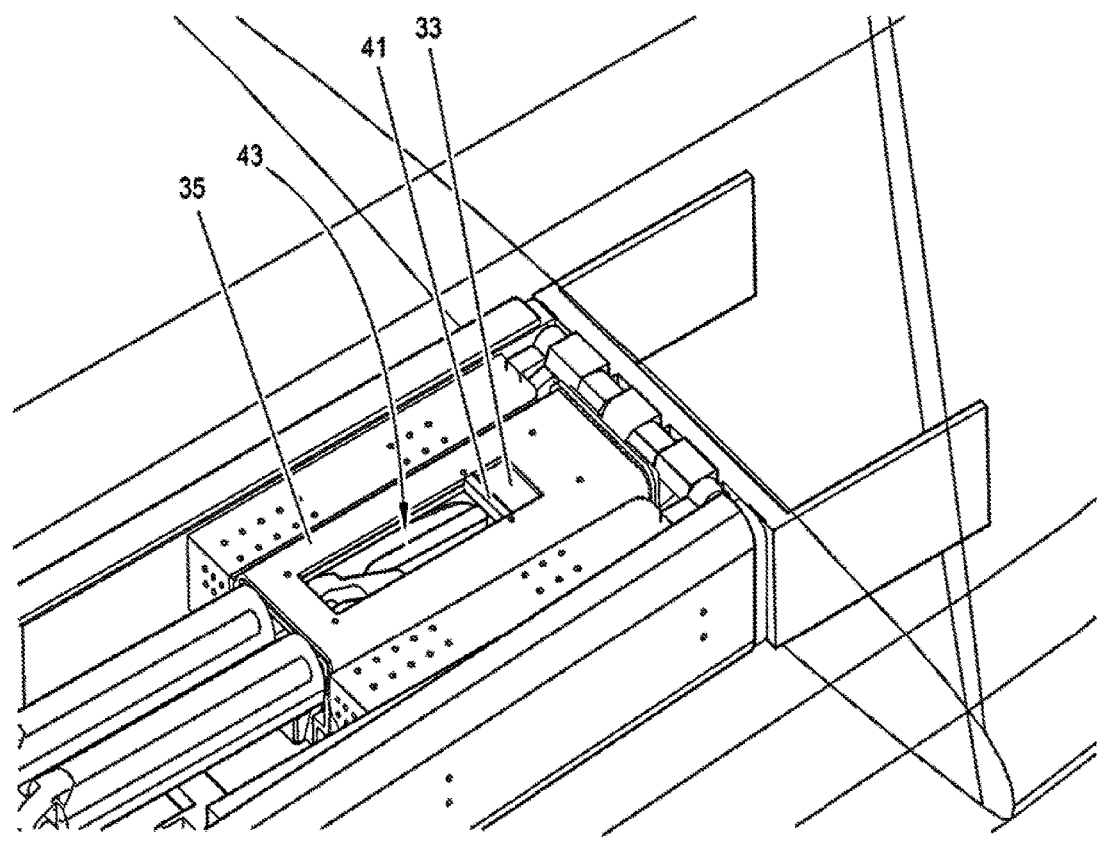
FIGS. 8a and 8b are cut-away perspective views of the wing in the first embodiment of the invention, showing the actuation assembly when the wing tip device has undergone the first stage of movement.
Figure 8B:
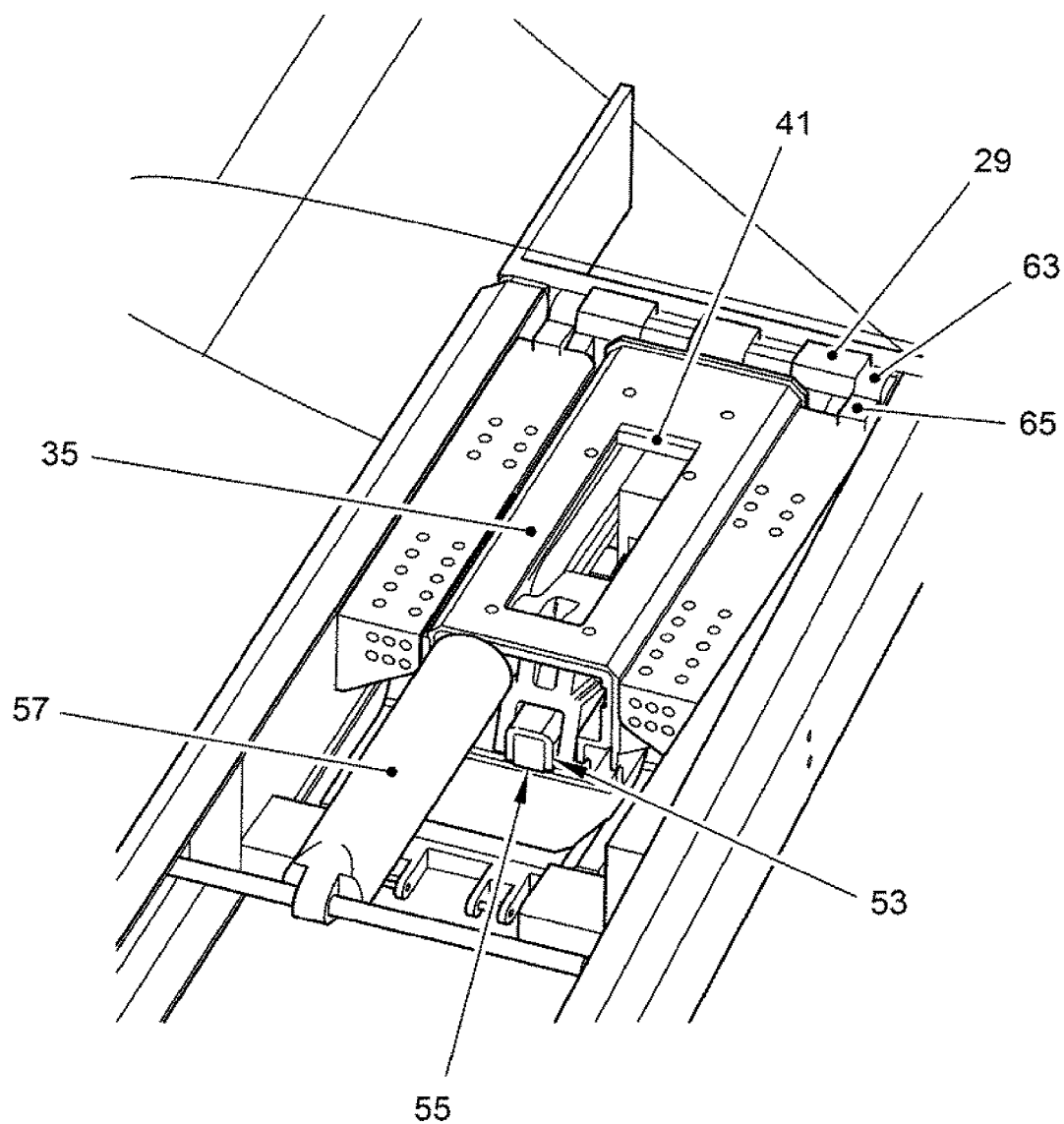
Figure 8C:
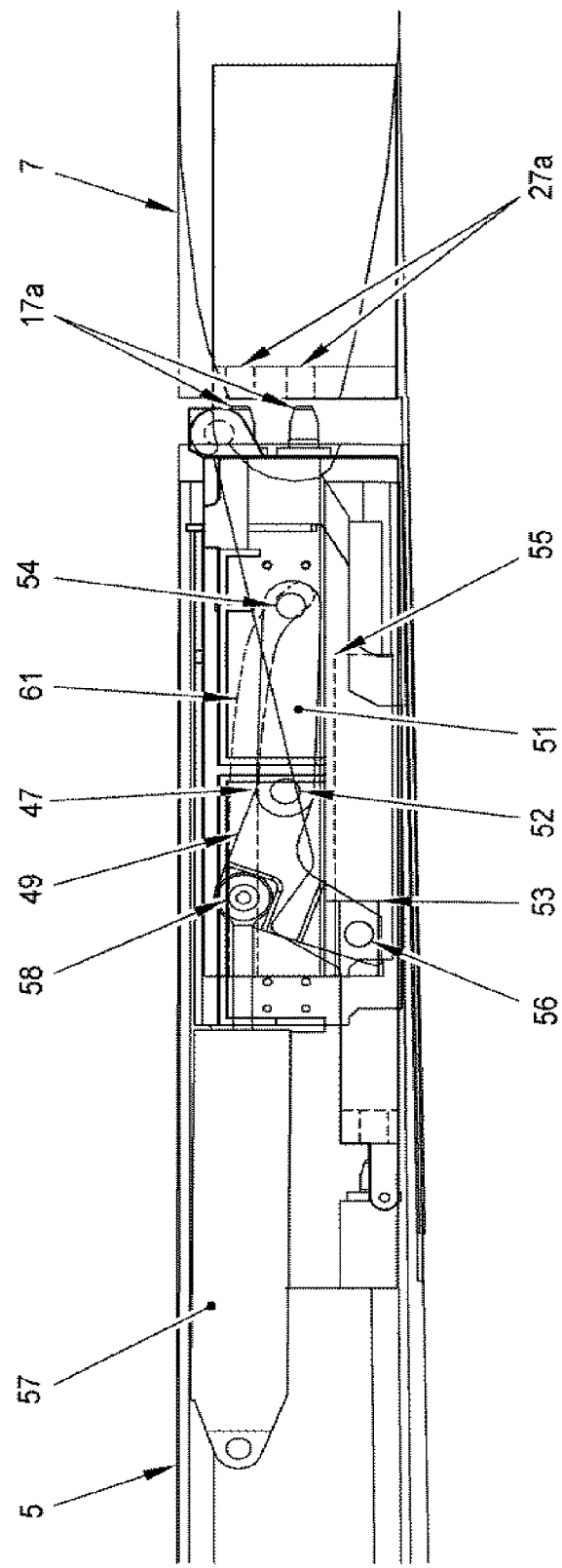
FIG. 8c is a cut-away front view of the wing in FIGS. 8a and 8b.
Figure 8D:
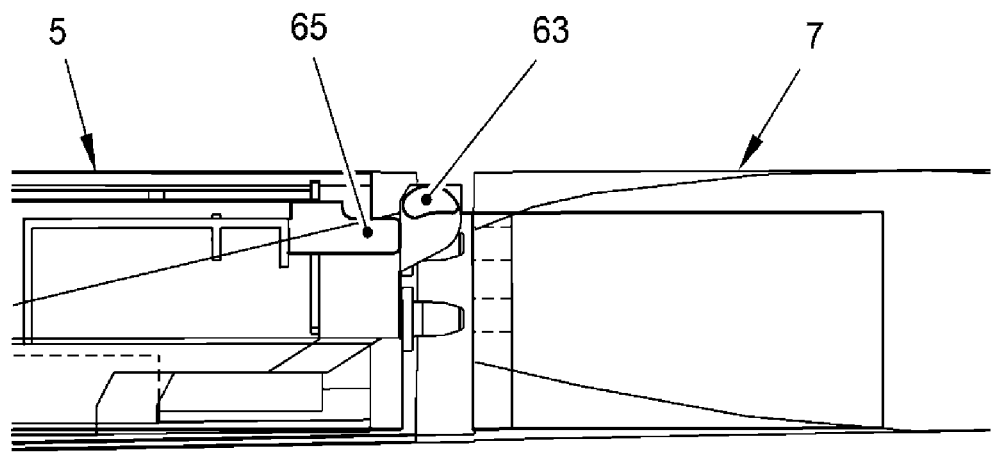
FIG. 8d is a cut-away front view of the wing in FIGS. 8a-8c, showing the rotational stop feature.

As most clearly shown in FIGS. 8a and 8b, the lip 41 of the sliding chassis 33, has at this point reached the end of the channel 43 in the fixed chassis 35 (i.e. the distance X in FIG. 7a is only fractionally longer than the length of the spigots 17a-c that had been received in the bushes 27a-c). The lip 41 abuts the end of the channel 43 and prevents further linear movement of the sliding chassis 33 beyond this point. However, the rotational stop feature 63, 65 is designed such that, at the same time the lip 41 abuts the end of the channel 43, the kidney-shaped end caps 63 simultaneously reach the end of the abutment surface 65 (see FIG. 8d) such that the wing tip device 7 is freed to rotate about the hinge 29.

Figure 9A:
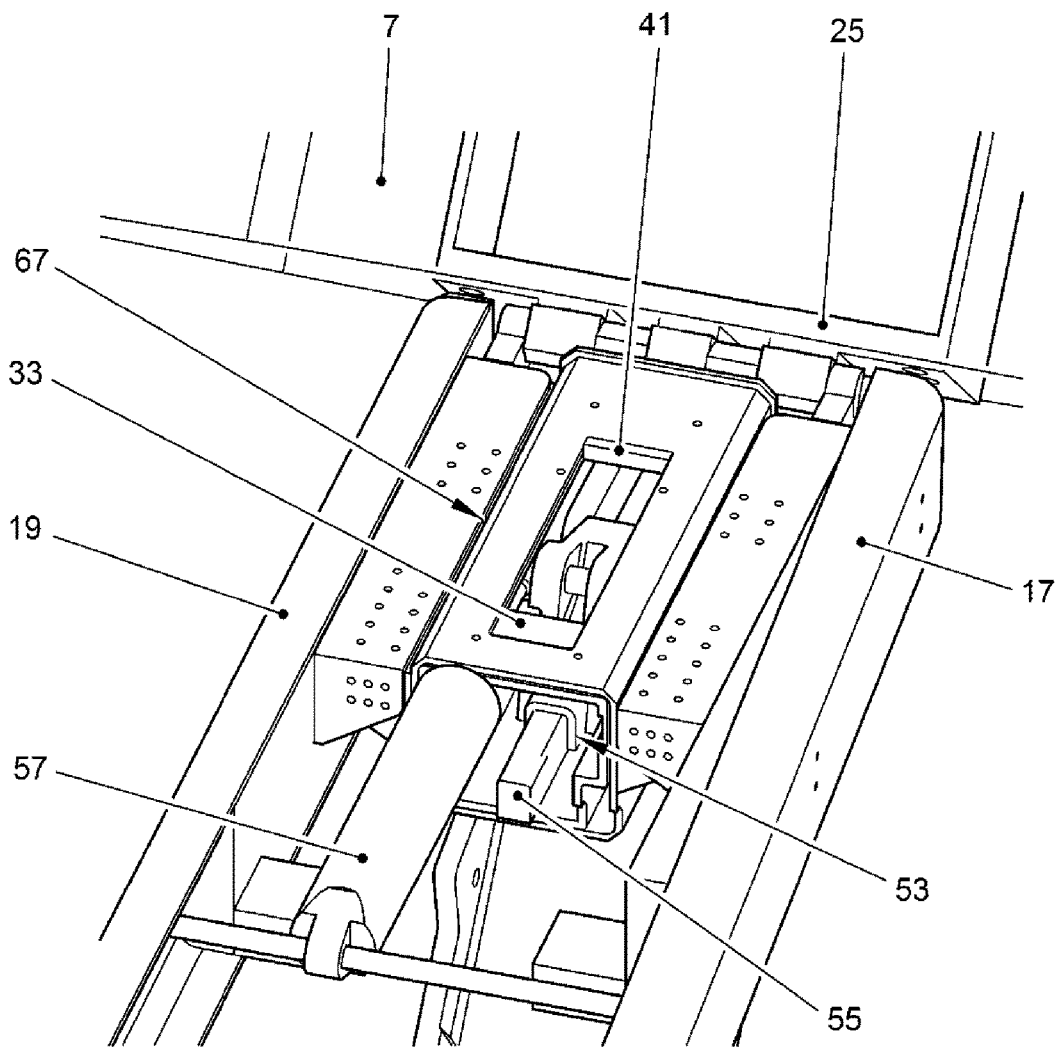
FIG. 9a is cut-away perspective views of the wing in the first embodiment of the invention, showing the actuation assembly when the wing tip device is moving during the second stage of movement, towards the ground configuration.
Figure 9B:
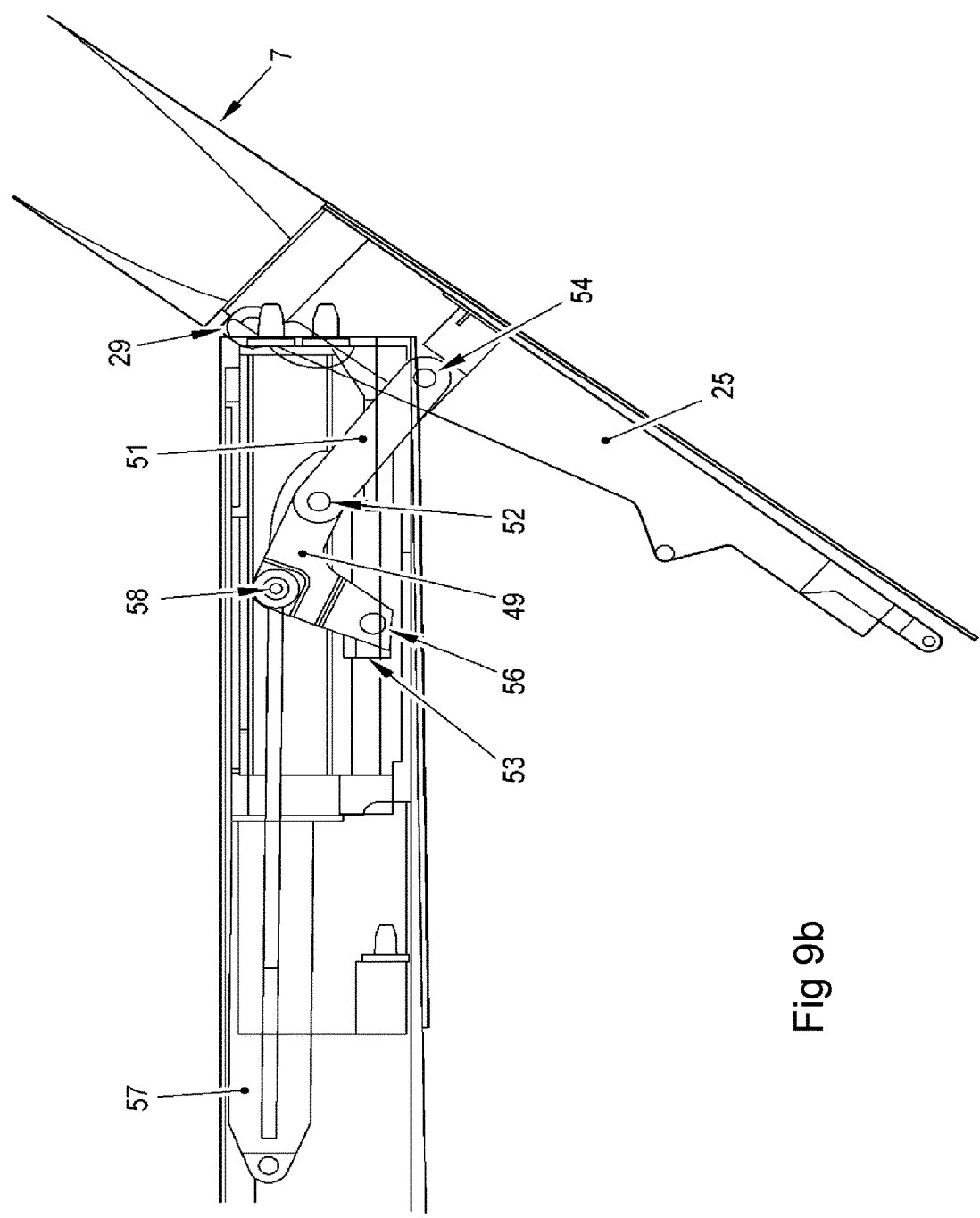
Figure 10A:
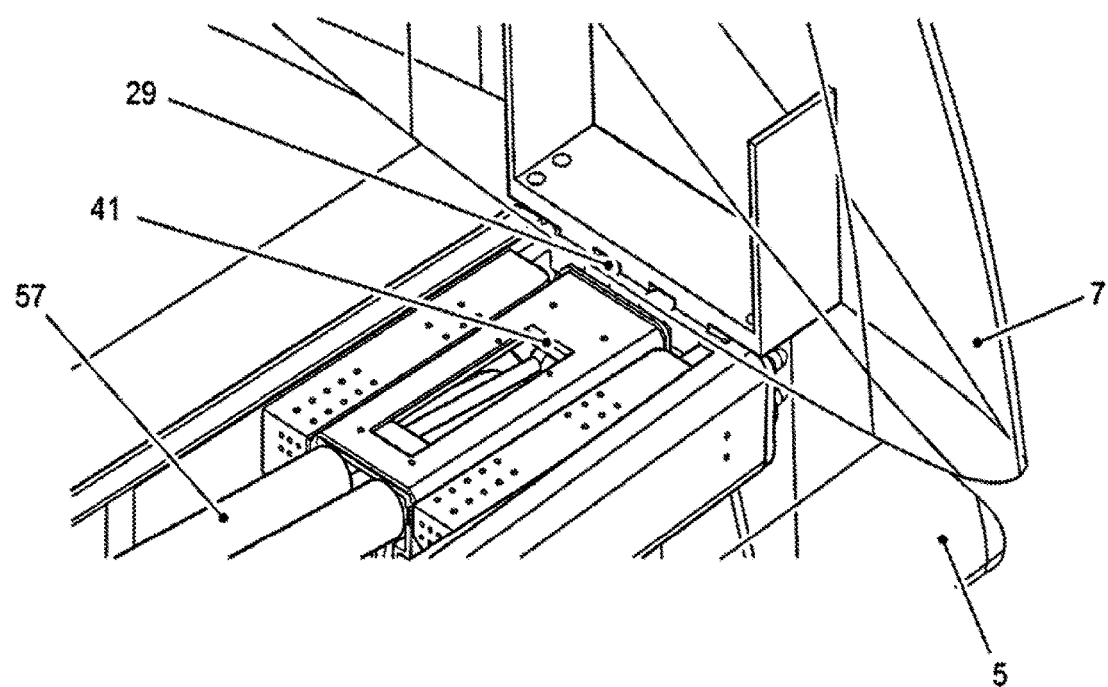
FIG. 10a is a cut-away perspective view of the wing in the first embodiment of the invention, showing the actuation assembly when the wing tip device has moved to the ground configuration.
Figure 10B:
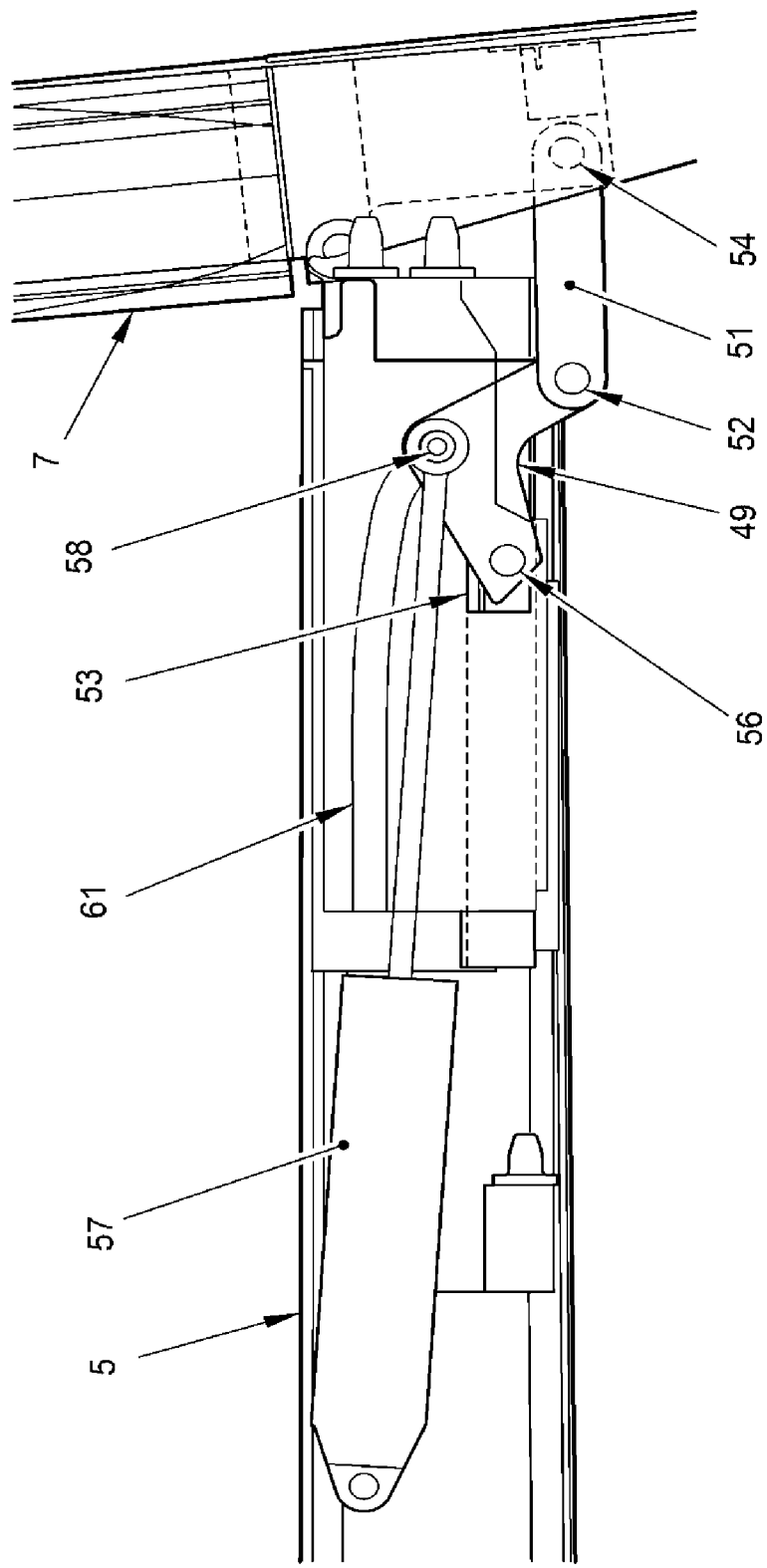

Continued extension of the actuators 57 thus ceases to effect a translational movement, and instead effects a rotation of the wing tip device 7 about the hinge 29 (i.e. the second stage of movement). As best illustrated in FIGS. 9a and 9b, the sliding chassis 33 now remains stationary but the articulation mechanism 47 moves along the central rail 55. The locus of the rotational connection 58 on the bell crank 49 (at which the actuator is attached) follows the drooping groove 61 (as best illustrated in FIG. 10b). The groove 61 is shaped, along its first half, to maintain the link 51 in an orientation that is approximately inline with the rotational connection 58 and the first and second pivots 52, 54 and to transfer the actuation force onto the wing tip device 7 at a location remote from (i.e. offset from) the hinge 29. This creates a moment arm, about the hinge 29, which acts to rotate the wing tip device 7 upwardly.

Figure 9C:
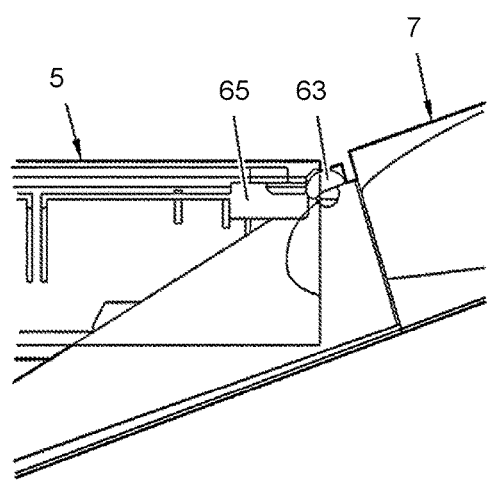
FIGS. 9c and 9d are cut-away front views of the wing in FIGS. 9a-9b at different moments during the movement towards the ground configuration.
Figure 9D:
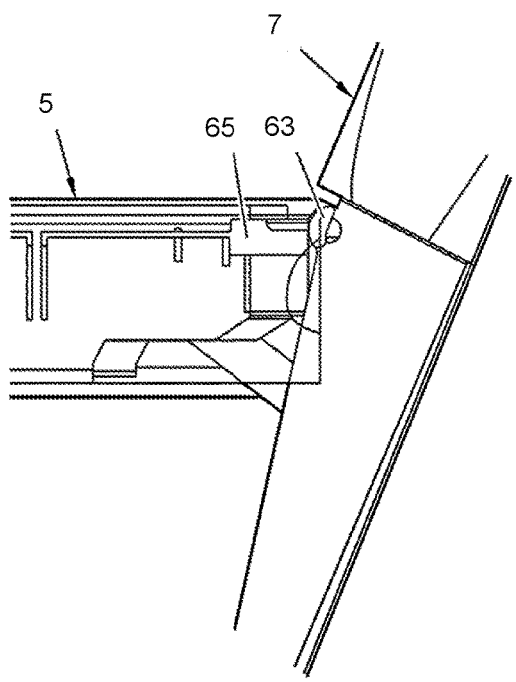

FIGS. 9c and 9d show how the end-cap of the hinge no longer prevents rotation, as it is clear of the abutment surface.

Continued extension of the actuators 57 moves the wing tip device 7 into the ground configuration (shown in FIGS. 10a and 10b) in which the wing tip device 7 is upright, above the hinge 29. The end of the groove 61 is drooped so that the primary component of force along the bell-crank 49 continues to act to pull the slider 53 along the rail 55, rather than merely generating large vertical reactionary forces against the rail 55. In the ground configuration, the bell-crank 49 and slave link 51 form an over-centre lock (discussed in more detail below).

Figure 10C:
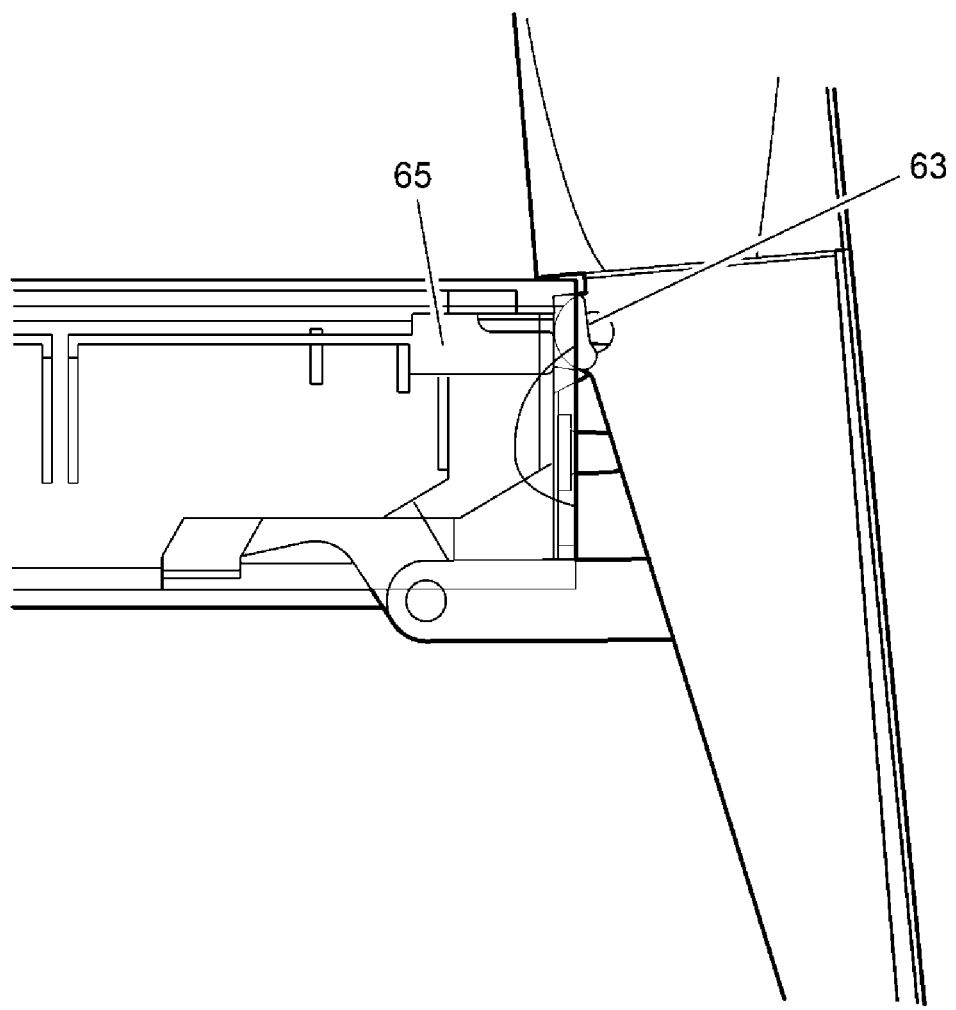
FIG. 10c is a cut-away front view of the wing in FIGS. 10a and 10b, showing the rotational stop feature.

FIG. 10c shows how the end-cap 63 of the hinge 29 continues to allow rotation, as it is clear of the abutment surface 65.

The actuation assembly 31 in the first embodiment of the invention has been designed to be quickly and easily installed on the aircraft fixed wing 5. In particular, the actuation assembly 31 comprises a fixed chassis 35 and a sliding chassis 33 (the latter containing the articulation mechanism 47). Since all components in the actuation assembly 31 move relative to the fixed chassis 35, the fixed chassis 35 can simply be held whilst the assembly 31 is bench-tested prior to installation on the spars 19, 21 of the wing. There is no need for all testing to take place during, or after, installation on the fixed wing 5. This may enable the actuation assembly 31 to be a 'line replaceable unit' (LRU).

Figure 11:
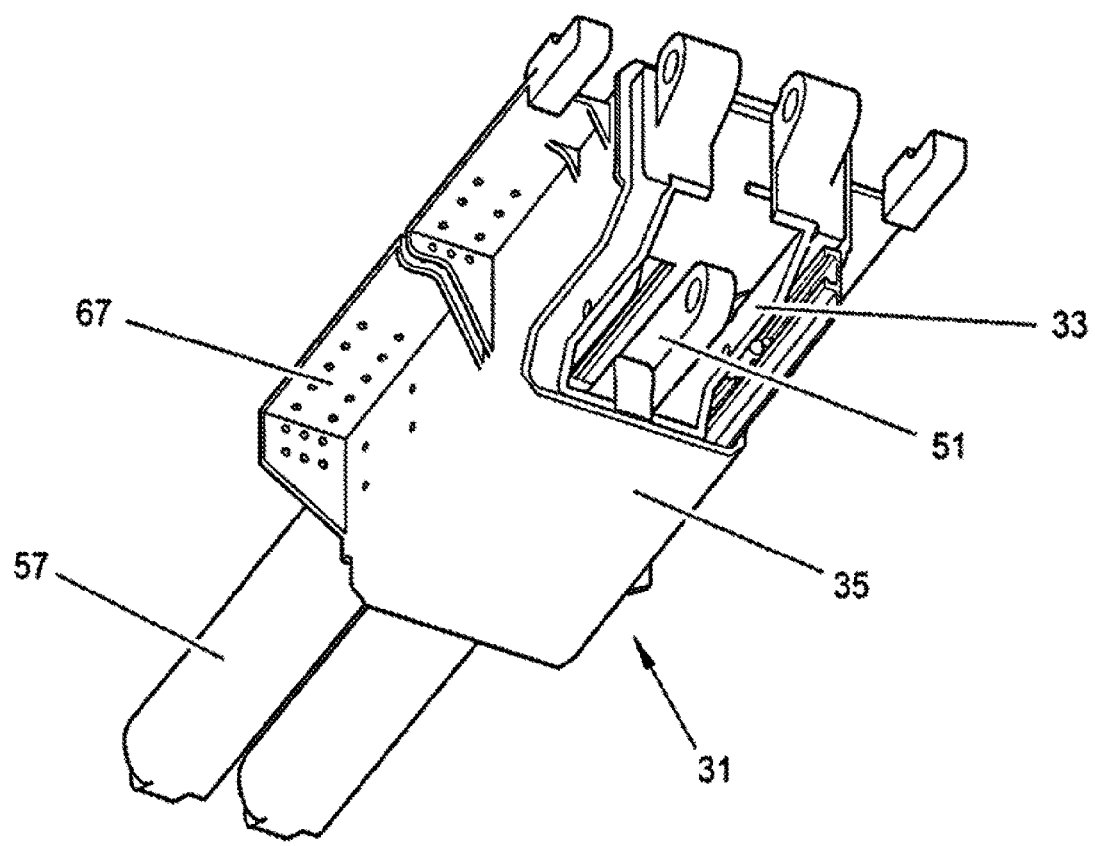
FIG. 11 is a perspective view of the actuation assembly in the wing of the first embodiment of the invention.
Figure 12:
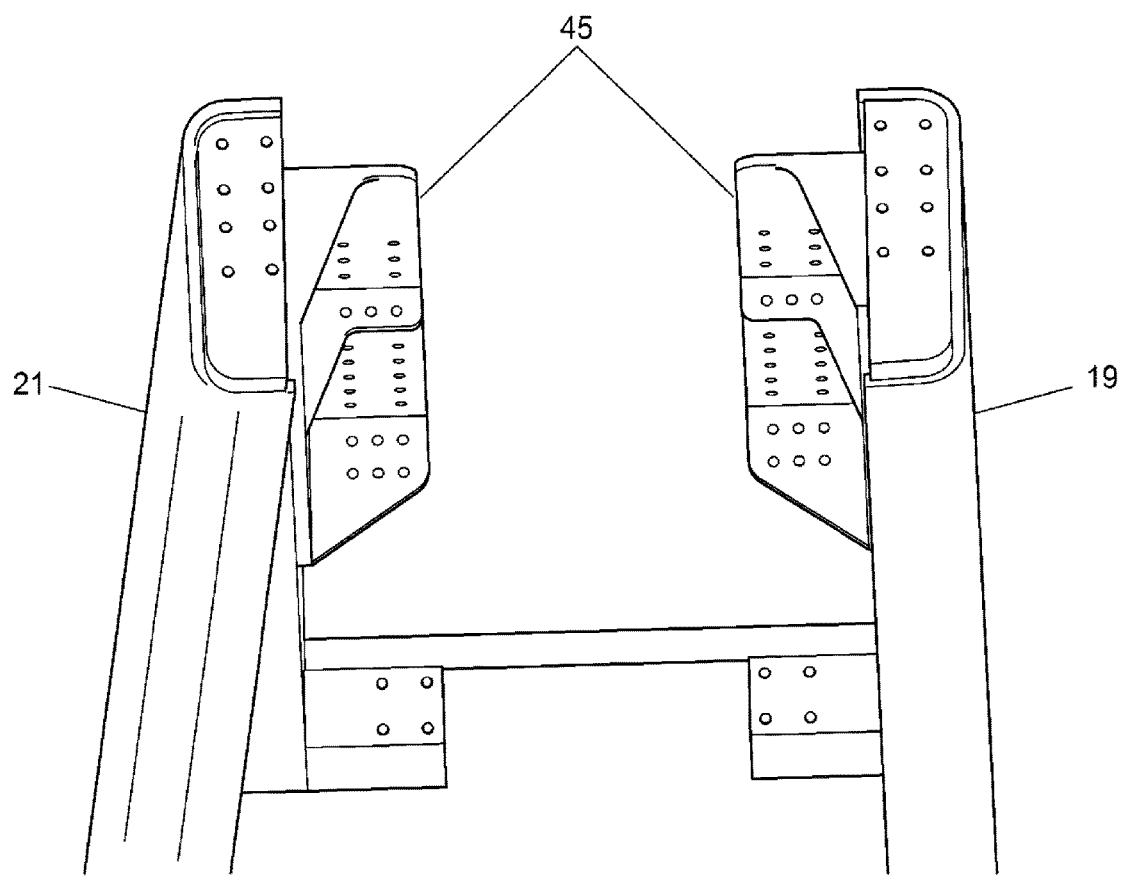
FIG. 12 is a perspective view of the wing box, having a fixed chassis ready to receive the actuation assembly of FIG. 11.

As shown in FIGS. 11 and 12, the fixed chassis 35 comprises laterally extending flanges 67 for attachment to a bath tub fitting 45 (FIG. 12) on the fixed wing spars 19, 21.

Figure 13A:
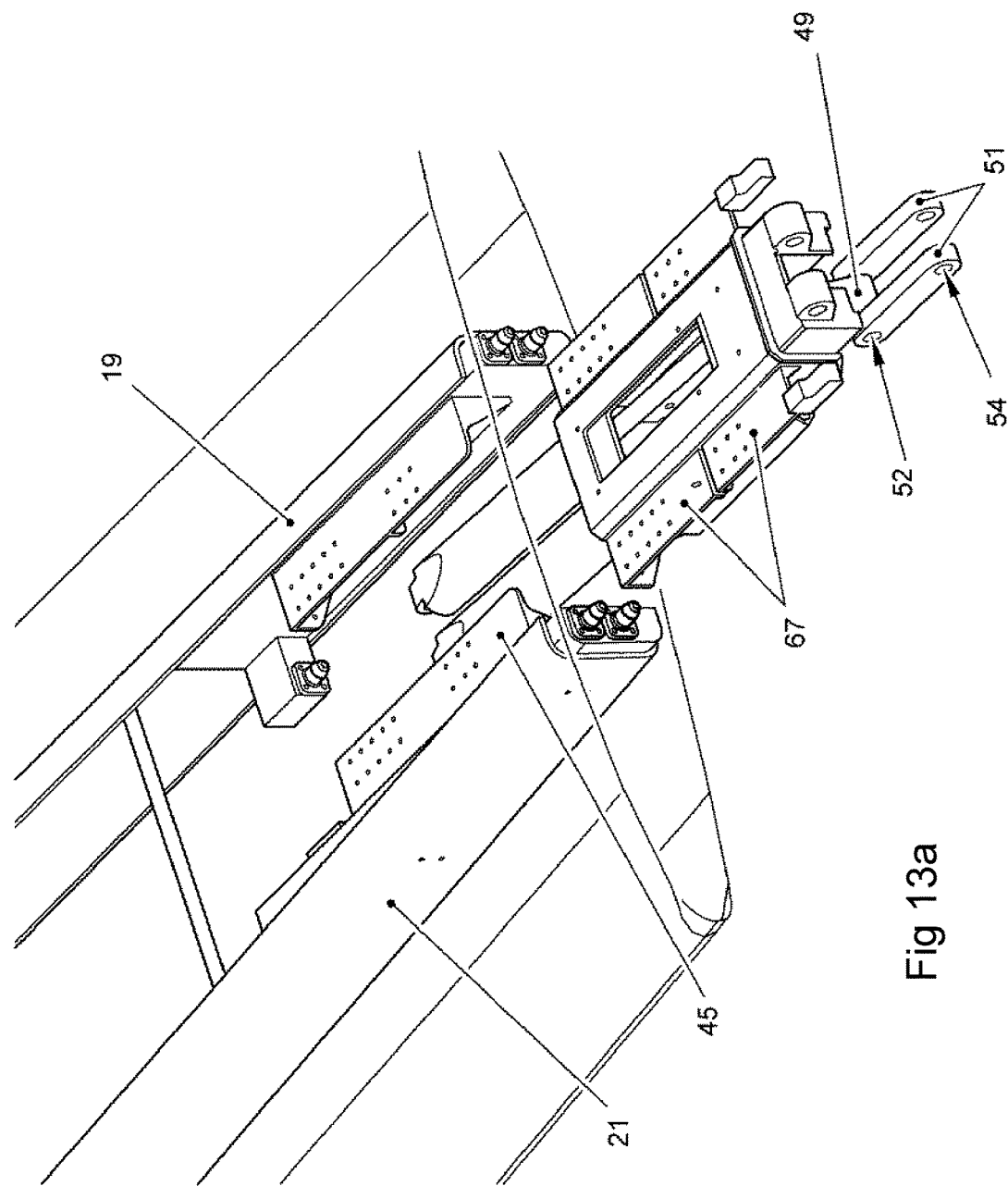
FIGS. 13a to 13c are perspective views showing the actuation assembly of FIG. 11 being mounted into the fixed chassis of FIG. 12.
Figure 13B:
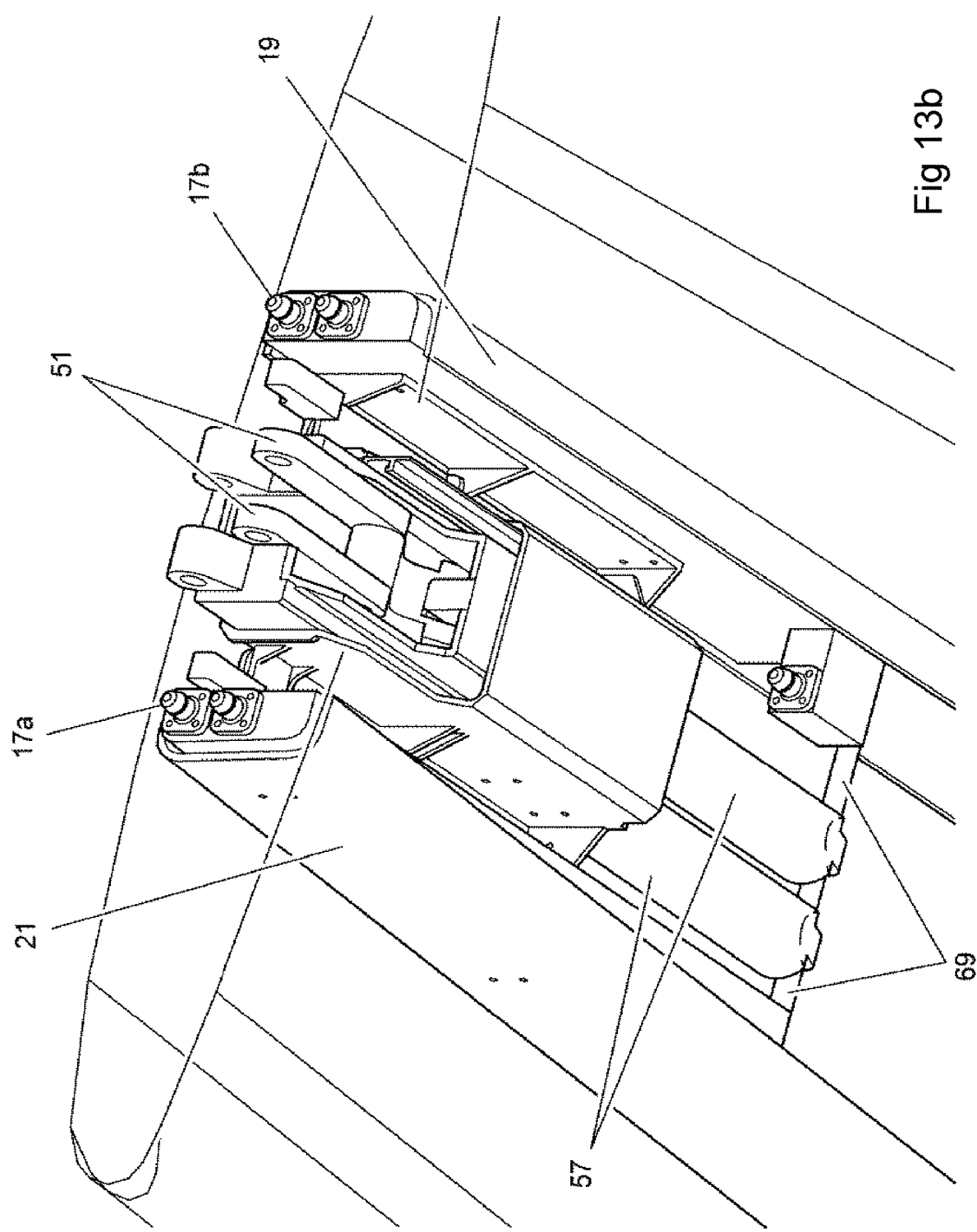
Figure 13C:
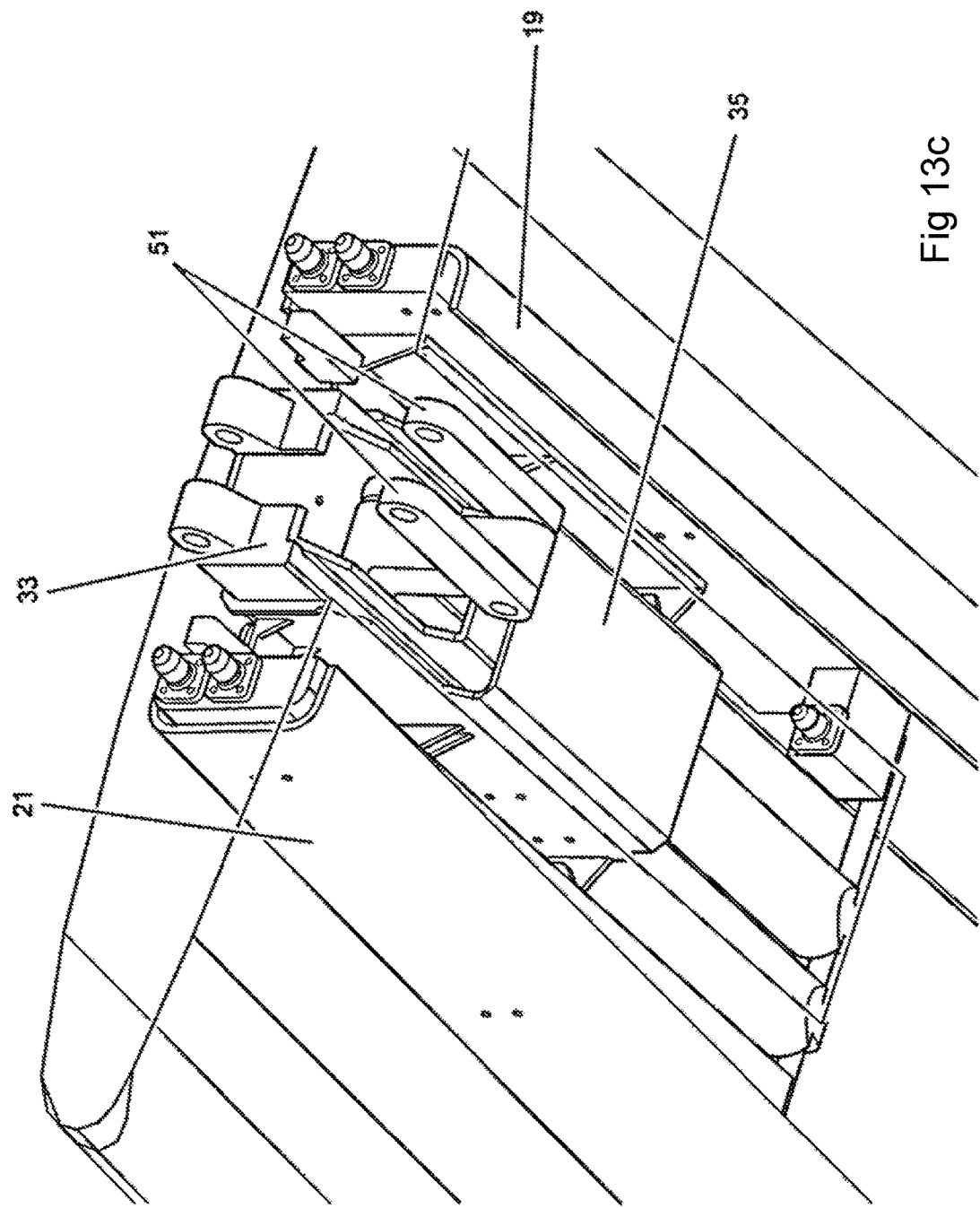

The installation of the actuation assembly 31 takes place in two steps. Referring to FIGS. 13a and 13b, the actuation assembly 31 is first secured relative to the fixed wing 5 by inserting the assembly from underneath the wing, and fastening the fixed chassis flanges 67 to the bathtub fitting 45. Referring now to FIG. 13c, the actuators 57 are then attached at one end to a bar 69 extending between the spars 19,21, and at their other end to the rotational connection 58 on the bell crank 49.

Figure 14:
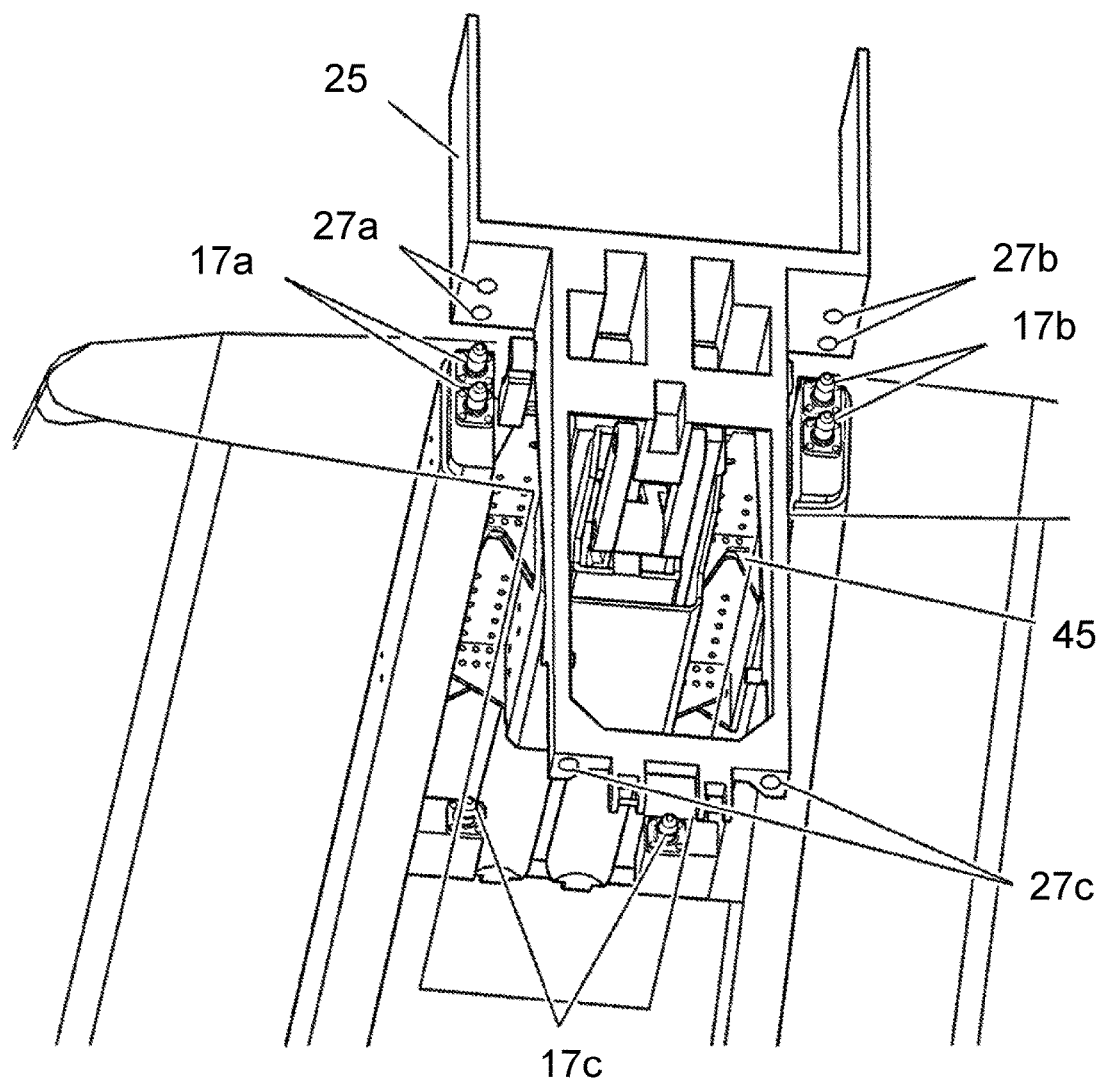
FIG. 14 is a perspective view showing part of the wing tip device being attached to the actuation assembly of FIGS. 13a-13c.

To install the wing tip device 7, the actuation assembly 31 is set to its configuration in the ground configuration (i.e. the actuators 57 are fully extended). Referring to FIG. 14, the wing tip device frame structure 25 is then lowered into the hinge 29 and the slave link 51 is attached to the frame 25 at the offset location from the hinge 29.

Referring back to FIG. 10b, the articulation mechanism is arranged such that when the wing tip device 7 in the ground configuration, the master bell crank 49 and the slave link 51 are in an over-centre position. More specifically, the first pivot 52 (between the bell crank 49 and the slave link 51) is out of line with the second pivot 54 (between the link 51 and the wing tip device 7) and the third pivot 56 (at which the bell crank 49 is pivoted on the slider 53). This creates an over centre lock to lock the wing tip device in the ground configuration. That lock can only be unlocked by retraction of the actuator 57. It will be appreciated that the over-centre lock is also created by that same actuator 57 as it extends to move the wing tip device into the ground configuration. Thus, the same actuator is arranged to move the wing tip device and make/break the over centre lock that holds the wing tip device in the ground configuration. This removes the need for a separate actuator to lock/unlock the wing tip device in the ground configuration.

Figure 15A:
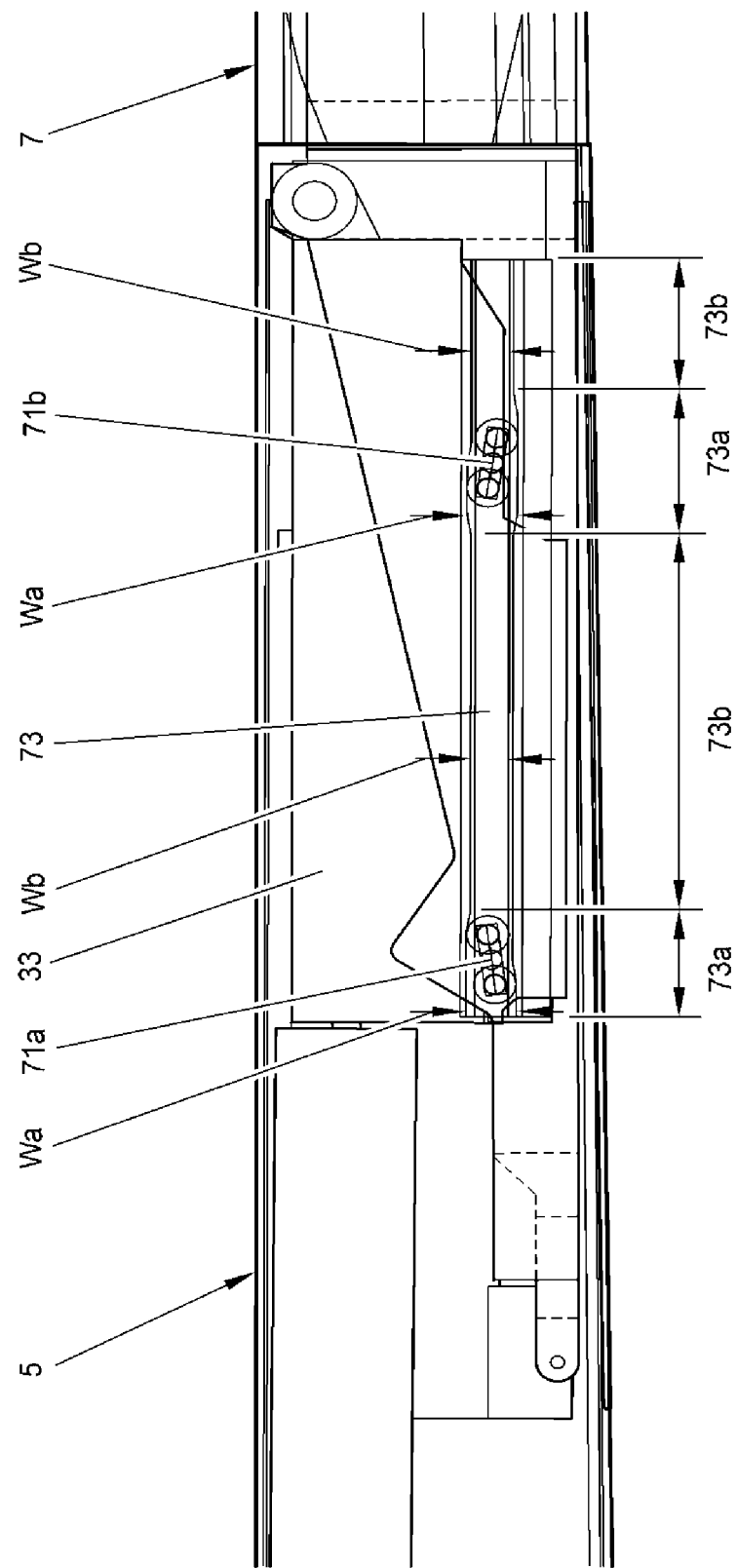

FIGS. 15a and 15b are sectional views along a spar-wise cut in the wing, showing the actuation assembly 31, with particular focus on a track and follower arrangement between the fixed chassis 35 and the sliding chassis 33, as will now be described:

The sliding chassis 33 is received inside the fixed chassis 35 on a follower in the form of two pairs of spring loaded bogies 71a, 71b (only one of each pair 71a, 71b is visible in the views of FIGS. 15a and 15b). The bogies 71a, 71b are received in a C-track 73 shaped into the inner surface of the fixed chassis 35, and are moveable along the track 73 to enable a sliding movement of the sliding chassis 33 relative to the fixed chassis 35 (it will be appreciated that a sliding movement need not necessarily be restricted to being via only a sliding contact; this term also encompasses a rolling contact as per this first embodiment of the invention).

The track 73 comprises first portions 73a which are relatively wide of width Wa (the vertical direction in FIGS. 15a and 15b), and second portions 73b, located outboard of the respective first portions 73a, that are relatively narrow of width Wb.

When the wing tip device 7 is in the flight configuration (see FIG. 15a), the spring loaded bogies 71a, 71b are located along the first portions of the track. They are spring-biased into an expanded orientation in which each bogie is at an angle such that it the wheels of the bogie 71a, 71b are in contact with both sides of the track 73 (for example the bogie is inclined to the longitudinal axis of the track such that one wheel is in contact with one side, and another wheel is in contact with the other side). The spring biasing force is relatively weak however. Thus, when the wing tip device is subjected to loads, such as flight loads, the spring loaded bogies 71a, 71b cannot provide any load transfer path, to transfer these forces into the fixed wing 5 (the bogies 71a, 71b would just change orientation under the action of a force, rather than transfer that force into the fixed wing 5). Instead, the loads are only transferred via the three pairs of spigots and bushes (17a-c/27a-c) previously discussed.

Such an arrangement ensures that the sliding chassis 33, and other parts of the actuation assembly 31, are effectively isolated from the flight loads on the wing tip device 7, when the device is in the flight configuration. The actuation assembly 31 does not, therefore, need to be sized to cope with the flight loads, enabling the actuation assembly to be relatively small and/or lightweight.

As described above, the track 73 comprises both relatively wide portions 73a and relatively narrow portions 73b. The track 73 is shaped such that when the wing tip device has undergone the first stage of translational movement, the sliding chassis moves along the track 73 such that the bogies 71a, 71b have moved from the wide portions 73a of the track to the narrow portions 73b. The narrow portions of the track are substantially the same width as the diameter of the wheels on the bogies 71a, 71b such that the bogies 71a, 71b are urged into alignment with the longitudinal axis of the track 73 and are held in a tight fit.

After this translational movement, the spigots 17*a-c* are clear of the bushes 27*a-c* (see description above with reference to FIGS. 3*a* to 4*b*). These spigots cannot, therefore act to transfer any loads. However, in the first embodiment of the invention, the actuation mechanism is at this stage no longer isolated from the wing tip loads because the bogies are received in a tight fit in the narrow portion 73*b* of the track 73; the bogies cannot move within the width of the track and therefore facilitate load transfer into the fixed wing 5.

Embodiments of the present invention recognise that the loads from the wing tip device are typically lower once it is no longer in the flight configuration, because at that stage there tend to be no flight-induced loads (the loads typically only being the weight of the wing tip device and/or gust loading on the wing tip device when it is folded upwardly). Thus, the actuation assembly can be relatively lightweight yet still be arranged to transfer these loads.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft wing comprising a fixed wing and a wing tip device at the tip thereof, wherein the wing tip device is configurable between:
   (i) a flight configuration for use during flight and
   (ii) a ground configuration for use during ground-based operations, in which ground configuration the wing tip device is moved away from the flight configuration such that the span of the aircraft wing is reduced,
   wherein the wing comprises an actuator and an actuation assembly, the actuation assembly comprising an articulation mechanism for transmitting the actuation force from the actuator such that actuation of the actuator moves the wing tip device between the flight and the ground configurations,
wherein the articulation mechanism comprises a master bell crank connected to the actuator and a slave link connecting the master bell crank with the wing tip device, the slave link being pivoted, at one end, to the master bell crank about a first pivot, the slave link being pivoted, at the other end, to the wing tip device about a second pivot, and the master bell crank being pivotably mounted, at its base, about a third pivot,
and wherein the articulation mechanism is arranged such that when the wing tip device is in the ground configuration, the master bell crank and the slave link are in an over-centre position such that the first pivot is out of line with the second and third pivots, thereby forming an over-centre lock to hold the wing tip device in the ground configuration.

2. A wing according to claim 1, wherein the actuator is connected to the master bell crank at a rotatable connection, and wherein the rotatable connection is constrained to move along a pre-determined locus upon actuation of the actuator.

3. A wing according to claim 2, wherein the rotatable connection is constrained to move along a groove, the shape of the groove determining the locus of movement of the connection.

4. A wing according to claim 2, wherein at least part of the locus is curved.

5. A wing according to claim 1, wherein the actuation assembly is arranged such that the wing tip device is moved from the flight configuration to the ground configuration in a two-stage movement, the two-stage movement comprising a first stage in which the wing tip device is translated away from the flight configuration in a linear movement only, and a second, subsequent stage, in which the wing tip device is rotated to the ground configuration.

6. A wing according to claim 5, wherein the wing tip device is mounted on a hinge and the wing tip device is rotatable about said hinge, during the second stage of movement.

7. A wing according to claim 6, further comprising a sliding chassis, slideably moveable relative to the fixed wing, and wherein the hinge is fixed, relative to the sliding chassis, the wherein during the first stage of movement, the sliding chassis is arranged to translate, thereby creating a linear movement of the hinge.

8. A wing according to claim 7, wherein the sliding chassis contains the articulation mechanism.

9. A wing according to claim 8, wherein, wherein the master bell crank is pivotably mounted on the sliding chassis about the third pivot, and the third pivot is slideably moveable relative to the sliding chassis.

10. A wing according to claim 7, wherein the actuation assembly comprises a fixed chassis onto which the slideable chassis is mounted, the fixed chassis being fixedly attached to the fixed wing.

11. An actuation assembly for use as the actuation assembly according to claim 1, the actuation assembly comprising the articulation mechanism arranged such that when the wing tip device is in the ground configuration, the master bell crank and the slave link are in an over-centre position such that the first pivot is out of line with the second and third pivots, thereby forming an over-centre lock to hold the wing tip device in the ground configuration.

12. The actuation assembly according to claim 11, wherein the actuation assembly comprises a fixed chassis for installation into a wing and the sliding chassis is slideably mounted in the fixed chassis.

13. A wing tip device coupled to the actuation assembly according to claim 11.

14. An aircraft comprising the aircraft wing according to claim 1.

15. A method of moving, and subsequently locking, a wing tip device in position using a common actuator, the wing tip device being in an aircraft wing comprising a fixed wing and a wing tip device at the tip thereof, wherein the wing tip device is configurable between:
   (i) a flight configuration for use during flight and
   (ii) a ground configuration for use during ground-based operations, in which ground configuration the wing tip device is moved away from the flight configuration such that the span of the aircraft wing is reduced,
the method comprising the step of:

providing an articulation mechanism comprising a master bell crank connected to the actuator and a slave link connecting the master bell crank with the wing tip device, the slave link being pivoted, at one end, to the master bell crank about a first pivot, the slave link being pivoted, at the other end, to the wing tip device about a second pivot, and the master bell crank being pivotably mounted, at its base, about a third pivot, and actuating the actuator to move the wing tip device from the flight to the ground configuration, the articulation mechanism being arranged such that when the wing tip device is in the ground configuration, the master bell crank and the slave link are in an over-centre position such that the first pivot is out of line with the second and third pivots, thereby forming an over-centre lock to hold the wing tip device in the ground configuration.

* * * * *